US009435315B2

(12) United States Patent
Kalnay

(10) Patent No.: US 9,435,315 B2
(45) Date of Patent: Sep. 6, 2016

(54) TRIMMING RIGHT-ANGULARLY REORIENTING EXTENDING SEGMENTED OCEAN WAVE POWER EXTRACTION SYSTEM

(71) Applicant: Peter Andrés Kalnay, Cupertino, CA (US)

(72) Inventor: Peter Andrés Kalnay, Cupertino, CA (US)

( * ) Notice: Subject to any disclaimer, the term of this patent is extended or adjusted under 35 U.S.C. 154(b) by 164 days.

(21) Appl. No.: 14/161,698

(22) Filed: Jan. 23, 2014

(65) Prior Publication Data

US 2015/0204302 A1    Jul. 23, 2015

(51) Int. Cl.
*F03B 13/18*    (2006.01)

(52) U.S. Cl.
CPC ...... *F03B 13/1815* (2013.01); *F05B 2270/107* (2013.01); *F05B 2270/18* (2013.01); *Y02E 10/38* (2013.01)

(58) Field of Classification Search
CPC ............ F03B 13/1815; F05B 2270/18; F05B 2270/107
USPC ............... 60/497, 500, 505, 506; 290/42, 53
See application file for complete search history.

(56) References Cited

U.S. PATENT DOCUMENTS

| 4,241,579 | A | * | 12/1980 | Borgren | F03B 13/1885 60/504 |
| 4,389,843 | A | * | 6/1983 | Lamberti | F03B 13/1815 290/42 |
| 4,781,023 | A | * | 11/1988 | Gordon | F03B 13/20 290/42 |
| 4,792,290 | A | * | 12/1988 | Berg | F03B 13/1815 417/332 |
| 5,052,902 | A | * | 10/1991 | Labrador | B01D 61/10 417/330 |
| 7,768,144 | B2 | * | 8/2010 | North | F03B 13/1805 290/42 |
| 2011/0113770 | A1 | * | 5/2011 | Zhang | F03B 13/1815 60/497 |
| 2014/0042744 | A1 | * | 2/2014 | Daya | E02D 25/00 290/42 |

* cited by examiner

*Primary Examiner* — Hoang Nguyen

(57) ABSTRACT

Floating platform apparatus for wave power conversion, consisting of armatures with buoyant, semi-submersible segments pivotally joined to an interlinking segment for controllable, repeated transitions of the primary axis of the entire apparatus from the extended horizontal posture to the vertical posture while still permitting the armature to oscillate in two planes within a restrictive collar, the oscillations thrusting fluid pumps to drive a generator to derive electrical power from the motion. Environmental sensing causes adjustment of the length of the armature and of the variably fixed facing angle of the collar within the interlinking segment in order to harness and manage forces impinging on the system. Dynamic harmonic tuning and resonance management are achieved by varying armature length through employment of telescoping, nested elements in the armatures.

9 Claims, 18 Drawing Sheets

Figure 1:
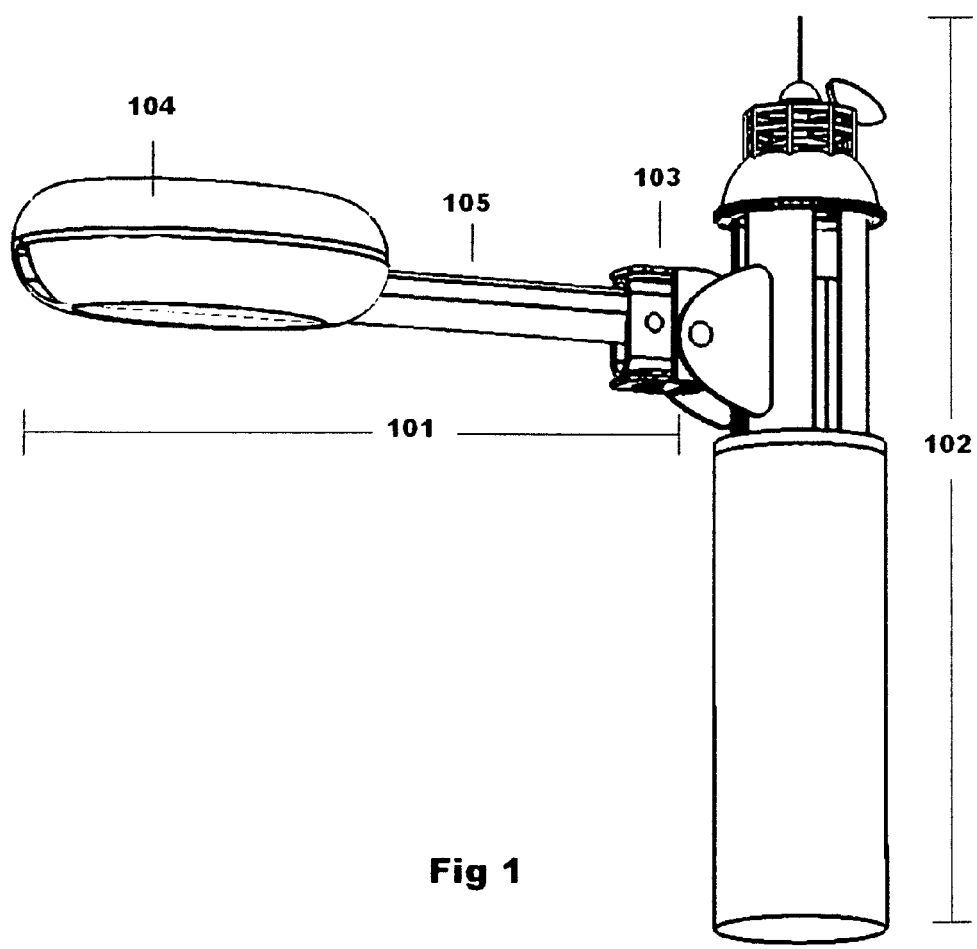

TRIMMING RIGHT-ANGULARLY REORIENTING EXTENDING SEGMENTED OCEAN WAVE POWER EXTRACTION SYSTEM

BACKGROUND OF THE INVENTION

The vast hydrokinetic and potential energy in the swells of oceans, great lakes, and other large bodies of water, particularly prevalent at temperate and higher latitudes, has long been recognized as a potential, eventual source of abundant, renewable, and relatively very clean power for the future. In comparison to other "green" sources of energy humankind needs to exploit for power, particular features of ocean wave energy hold special promise. Unlike solar energy, it is available around the clock rather than diurnally. It persists longer than wind, and sometimes conveniently travels from points of generation toward the shore where population centers often are concentrated. It arises in the medium which covers three quarters of the globe, and even has the potential for enhancing the habit of life forms that dwell where it would be deployed without displacing human populations or competing land uses. Conflicting, incompatible, and prior private and sovereign claims on this resource are fewer than in the case of land based alternatives.

The predominant form of renewable oceanic energy by a wide margin resides in surface swells and waves over deep water especially to the lee of wide reaches and principally is found at temperate and greater latitudes both north and south. Energy in this form has already undergone a double conversion from solar to wind to wave. Other very significant and potentially harvestable sources of power certainly are present in bodies of water but which do not pertain to the present invention include tides, currents, temperature differentials, waves breaking on shore, and gravity water flow over land (e.g. hydroelectric dams). Well over two thirds of the energy is lost as swells move from deep to shallow water, hence the present invention is primarily intended for deep water deployment. The velocity of a deep-water ocean wave is proportional to its period, and waves of different period interact. The consequence of this dispersion is that faster moving waves can catch up and may combine with slower moving preceding shorter waves not always moving in exactly the same direction, with results both dangerous and difficult to predict. While the physics of an ideal wave is well described and calculable, an actual sea state is complexly multi-factored. Short time prediction of the direction and crest height of on-coming waves is a critical problem in the field of wave energy, but one far from fully solved. Mathematically, cyclical models, dynamic harmonic regression, auto-regressive models, and neural networks have all been brought to bear. It has been recognized in the field that a definitive solution, which so far has proven elusive, could be greatly beneficial to the development of effective Wave Energy Converters that would be economically viable.

Devices meant to reap power where energy abounds in open water had better be able stand up to and fend off—and/or duck—the punches Neptune can deal out. Severe conditions can unleash forces several magnitudes greater than normally prevail. In very high seas even water without whitecaps can pile up upon encountering obstacles in its path, and then sweep over like a breached dam at very high speeds. White water breakers can dump tons of water over objects in their way. Masses of water can rise over and come hammering down atop moored vessels. While adjectives like "gigantic", "towering", "immense" or "battering" commonly found in descriptions of waves in very high seas point to the power and uncertain duration of waves, historically words like "angry", "treacherous", "capricious", "chaotic", "tricky", "rogue", "constantly changing" and "freak" also occur frequently in this context, and testify to other problematic and difficult-to-model qualities of the ocean wave dynamic: the randomness, unpredictability, and frequency of anomalous, powerful occurrences at sea. Wave activity in roiling seas has required mariners from time immemorial to "expect the unexpected", and gives vivid testimony to stochastic and nonlinear aspects of the complex hydrodynamics of the open water wave system. Marine design has been more an art and craft than a science for most of humanity's long sea-faring experience and largely remains so even up to today, another indication of the complexity of a still imperfectly understood natural environment.

The wave energy theoretically available for extraction by a floating apparatus is directly proportional to the area, and hence to the square of the radius, of the apparatus under which the swells pass. The great bulk of this energy resides in a thin layer at and just below the surface. These two monumental physical facts—the sporadically immense fits of violence unleashed in the oceanic environment and the superficial location of the mother lode of energy hopefully there to be mined—have loomed very large in the development of prior art in devising buoyant apparatus for converting this energy to useful power. By definition a buoyant apparatus is exposed to the teeth of the forces present at the surface. The recurrent question facing innovators in the field has been what shape and configuration of buoyant platform can best withstand the tremendous forces which it will have to face sooner or later and yet still effectively perform the desired function of converting energy to usable power. Many answers have been proffered, and even a quick survey of the main ones would be completely beyond our scope here, but the following general observations constitute essential background for the present invention.

One approach found in prior art employs a vertical configuration so as to minimize exposure of the apparatus' most buoyant components at the waterline. This has given rise to the branch of field concerned with point source solutions, with heavier parts of the apparatus located safely below—rigidly affixed to the sea bottom, a submerged segment tightly tethered to the buoyant component directly above, use of a "reactive mass" sunken underwater instead of a direct connection to the sea floor, and so forth. The relative calmness of the depths is a safe harbor for the lower part of the apparatus, in vertical counterpoint to the rising and falling of buoyant components overhead. Given drift due to wind, currents, and wash effects from piled up water breaking as waves, maintaining proper vertical alignment is a recurrent, daunting challenge when it comes to this vertical approach. A variation in the point sources branch of the science gives rise to the internal-external concentric collocation of buoyant and non-buoyant members in the manner of cylinder and piston, where the buoyant or heavier-than-water element may be either member, and there have been many inventions on this principle. Another problem is that cancelling harmonics can produce listless response in active waves of the wrong wavelength. However, the buoyant components of such vertically configured apparatus have had the benefit of borrowing from tried and true forms for navigational buoys developed over the last millennium. Many centuries of experience with navigational buoys have proven the worth of the vertically oriented shapes (barrel, nun, spar) that survive best under these worst-case conditions: all provide a primary axis not parallel to—but rather perpendicular to—the surface, with the bulk of the buoys' mass safely stowed below the waterline. However, considerable build up in terms of carrying capacity above waterline has shown to be quite acceptable provided aerodynamics and hydrodynamics that do not expose excessively broad, flat surfaces to the wind and waves.

An alternative branch of the field has taken a distinctly horizontal approach—specifying buoyant apparatus capable of lying across the surface in all conditions. Thus the art has seen the development of massively constructed, smooth bodied, segmented apparatus intended to ride out the extreme conditions fundamentally in same horizontal orientation as surface vessels. Probably the best known and tested exemplar features four linearly arranged segments the length size of light rail cars (each approximately 105 fee [32 meters] long) and cigar-shaped like surfaced submarines riding very low to the water, and linked end to end so as to snake in the troughs among swells as well as ride up and down in swells. The resulting mechanical work is used to drive hydraulic turbines running electric generators. Most ingeniously, the design incorporates innovations in confine the relative motion between segments in two not quite perpendicular planes, and by selectively switching the between the operating planes, to some extent the apparatus can be tuned to the prevailing conditions, either for increasing output or for reducing stress in extreme conditions.

In the branch of the field concerning energy buoys extending horizontally over the surface, inevitably there is a penalty to massive construction that is paid in terms of reduced efficiency under the less severe conditions which are present most of the time. It is only an object of trivial mass which "floats like a cork". The inertia from their greater mass causes heavier buoys to rise and fall somewhat out of phase with the swells lifting them. Inertia and momentum causes them to overshoot the waves in which they rise and fall both on the way up and on the way down. On the one hand, segments of fixed length long enough to efficiently convert the power of swells in "well-organized" seas may plow through or float listlessly in choppy or chaotic seas converting little of the abundantly available short wave length energy to useful power. On the other hand, segments of fixed length short enough to function effectively in choppy, wind whipped conditions are ill-suited to tap the energy of powerful swells of longer amplitude and wavelengths. Segments meant to ride parallel to the wave surface needs must be massively constructed to survive the most violent conditions. The bridge design engineer's greatest nightmare—additive harmonics capable of leading to complete disintegration—can also disturb the sleep of the innovators in realm of horizontally floating articulating platforms for harnessing oceanic wave energy.

SUMMARY OF THE INVENTION

The present teaching aims to disclose a scalable system of apparatuses and methods in their preferred embodiments all employing right-angularly reorienting buoyant segments and suitable for converting energy in open oceanic swells to perform mechanical work as a key stage in producing usable power across the entire range of ocean wave conditions. Right angle transitional reorienting functionality is offered to meet the most extreme conditions by assuming fundamentally the same attitude in very high seas as sturdy navigational buoys (and even tsunami-warning buoys) have been proven quite capable of withstanding, and as the way to transition into a horizontal posture in less violent seas. Once the apparatus has spread itself across the water surface in response to more moderate or milder wave conditions, added extensibility in terms of lengthening and shortening functionality to the buoyant segments in preferred embodiments aims to offer the way to tune or detune harmonic response to match the frequency and amplitude of swells. Taken together these two main functional capabilities, simple though they are, are intended to make possible highly adaptive "trimming" of the devices, as in the old sailors' sense of "trimming the sails", to meet highly variable conditions at sea.

The invention aims to show that with newfound trimming capabilities come new possibilities for coping not just with the force of extreme conditions at sea, but also of their suddenness and sporadic unpredictability, which sometimes can manifest themselves in quite localized ways. By envisioning multiple units of the invention deployed in arrays, the invention demonstrates that a powerful level of control becomes feasible, amounting to a distributed information gathering and information processing system. Systemic and scalable properties are deemed crucial for any invention that proposes to contribute toward the solution of the global climate crisis. Hence among the many feasible embodiments of the present invention, those preferred here are ones that utilize extant present-day technology and excess mass manufacturing capacity in the automotive, ship building, farm machinery, crane and earthmoving, rail, off-shore oil rigging, robotics, electronics, communications and aerospace industries. In other words, this disclosure aims to remove obstacles that have stood in the way of beginning without delay to extract meaningful amounts of power from this huge, renewable, natural energy source. Moreover, the present invention is highly suitable for deployment in conjunction with floating, sea-based off-shore wind turbine technology, given its potential to share both the buoyant platforms and take-off infrastructure of that emerging green power source.

The present invention belongs to the branch of art concerned with primary conversion of wave energy to the form of mechanical work using attenuated segmented buoys, a general approach well known and frequently employed in the field. This disclosure pertains to the branch of art that extracts energy from relative motion between two or among several articulating segments. Such compound, planar buoys are sometimes called articulating segment energy platforms. Following prior art, the apparatus consists of at least one buoyant segment pivotally joined to at least one Interlinking Segment with one or more degrees of freedom, so that mechanical work is derived from the oscillation centered about a pivot point of a buoyant segment under the influence of passing swells in which it floats. Oscillations will generally usually occur within a working range of an angle of just a few degrees. Depending on how many ways the segments are hinged, the oscillations that are reduced to mechanical work may be produced in more than one direction. Buoyant segments will be elevated and then lowered repeatedly relative to Interlinking Segments producing a vertical oscillation. If a second degree of freedom is permitted, segments will oscillate on the horizontal plane as buoyant segments slide down under the pull of gravity hewing to the troughs of swells, and this produces a sinuous motion. Typically, once wave energy is reduced to mechanical work, that work is used to drive hydraulic systems employing high pressure jets turning turbines spinning electric generators. The present invention assumes and follows some prior art in terms of secondary energy conversion from mechanical work to electricity (or other energy rich products) and in regard to "take off systems" to off-load the power after it is converted.

Examples of "other energy rich products" have to include hydrogen, oxygen, and desalinated water, along with mineral salts and organic by-products, all of which could be extracted from sea water on the platform and pumped through pipes running down umbilical cords, or else held in exchangeable tanks for shipping to shore. For practical purposes, however, direct electric current can be considered most common and efficiently transported output of most immediate interest.

In all its embodiments, the most prominent distinguishing characteristic of the apparatus of the present invention is the presence of a Right-Angularly Reorienting Buoyant Semi-Submersible Segment [Abbreviated "RRBSS Segment"] which has effective means not only to oscillate, but also to reorient the mean direction in which it faces to the extent of varying the pitch of its main axis over an angular range of approximately 90 degrees between lines parallel and perpendicular to the plane of the water surface. The RRBSS Segment is pivotally attached to an Interlinking Segment with at least one degree of freedom. Elongated in shape, RRBSS Segments have a Pivotal End and a Submersible End. Generally speaking, the preferred means for accomplishing such a large change in pitch in a buoyant segment pivotally attached at one end comprises a shifting of load by the addition, subtraction, redistribution or relocation of relatively weighty, massive elements in juxtaposition to the addition, subtraction, redistribution, or relocation of elements with specific gravity less than 1.0 which therefore contribute to buoyancy. In practice this opens the way a host of alternative potential arrangements, involving linear acceleration of floats and weights or pumping of gas and liquid in opposite directions in the case of closed ballast systems. In the case of open ballast systems, bilge tanks variously can be used for taking on or dumping water ballast, and even air filled ballooning floats offer additional effective means for the load shift. Linear acceleration in closed ballast systems offers advantages in terms of simplicity, solidity, and reduced exposure to corrosive elements, and so is offered in the preferred embodiments presented in detail here.

Of course, the angular oscillation of the submersible end of the RRBSS Segment quickly becomes increasingly buffered due to an increasing area encountering water resistance the more it submerges as its downward pitch increases, and this is precisely what allows stress on the apparatus in very energetic waters to be kept under control while conversion to mechanical work continues to be performed. Key to understanding the present invention is envisioning apparatus able to assume the approximate shape of a very rugged navigational buoys known from long experience to withstand the most difficult conditions, yet also able to spread its arms widely and horizontally across the water under more favorable conditions, transitioning back and forth in a controlled manner as conditions at sea allow or dictate. Naming the predominantly vertical position State V, the predominantly horizontal position widely spread out over the water's surface State H, and the various transitional positions in between State T, one can more conveniently describe and keep track of apparent morphological changes so pronounced that at first glance one may easily mistake embodiments of one and the same apparatus in different states as two separate devices, just as a picture of a caterpillar spinning its cocoon and a picture of the butterfly later emerging from it might be mistaken as representing two entirely different organisms of differing species.

Since the specified range of pitch variation (approximately 90 degrees) is several times greater than the working range of oscillation that can occur under the influence of passing swells, a Variably Facing Restrictive Shoulder is specified in all embodiments at the juncture between the RRBSS Segment and an Interlinking Segment. The shoulder variable sets the mean pitch bracketing the working range in which oscillation. Facing Clutch and Facing Brake are names given to respectively to parts of the variably facing restrictive shoulder that release and hold in place the shoulder at different pitches. Secondary Conversion Elements, such as hydraulic or pneumatic pumps or parts of geared rotary drives, positioned near the pivot point are fixed at one end on the variably facing restrictive shoulder and at their other on the oscillating RRBSS Segment. These secondary conversion elements transfer the mechanical work into forms suitable to generate electrical current.

The Interlinking Segment to which the RRBSS Segment is attached may take several alternative forms. It may be a second RRBSS Segment to which the first RRBSS is joined by a variably facing restrictive shoulder. The Interlinking Segment may be an Independently Buoyant Interlinking Segment to which the Pivotal End one or more other RRBSS Segments are attached. In fact, the independently buoyant interlinking segment could include an ocean-going vessel. The Interlinking Segment may also comprise a Submersible Interlinking Segment to which the submersible ends of one or more RRBSS Segments may be attached. In the most important preferred embodiments of the invention, the apparatuses are supported in the water entirely by buoyancy. Since wave energy diminishes rapidly as swells reach shallower water, it is understandable that fully floating systems, only loosely tethered to the ocean floor or hauled behind ships, have attracted more interest than rigidly fixed approaches, though a great deal of important work has been done in both areas. The present invention does include RRBSS segments articulating with the surface elements of Hard Anchored Interlinking Segments that are fixed below to the ocean bottom, and above to a buoyant telescopic element interlinking to the RRBSS segments. While relatively rare, there certainly are areas where outcroppings from an otherwise fairly deep sea floor reach up underwater to lesser depths where they can offer attractive fixed anchoring points without greatly diminishing the energy of swells to the extent shoals, reefs, or breakwaters would do.

While describing a single RRBSS segment articulating with a single "Interlinking Segment" is a useful way for representing the invention's most salient characteristics in its most basic, atomic from, in practice most embodiments call for a plurality of RRBSS segments, joined to one or more interlinking segments depending on the configuration. In one important configuration, two RRBSS segments may be attached to one Interlinking Segments. When pairs of RRBSS segments are linked together using an independently buoyant interlinking segment, they are said to be Inter-linked in Linear Fashion. In State H a pair of RRBSS segments will float horizontally on the surface in a linear chain, but in State V they will have folded together into a vertical position to ride out heavy weather in the posture of spar type navigational buoys. In the interest of maintaining balance, the two segments of each pair interlinked in linear fashion will generally be trimmed in unison, so their facing pitch angle is kept equal on either side of the interlinking segment. Two or several pairs may be interlinked in Linear Fashion to compose a longer chain by interspersing submersible interlinking segments at the Submersible Ends of the RRBSS Segments.

When three or more RRBSS are attached to a single Independently Buoyant Interlinking Segment, they are said to be Inter-linked in Radial Fashion. In State H, RRBSS Segments interlinked in radial fashion will appear to radiate like spokes from a wheel or petals of a daisy, while in State V they will be pursed together and all pointing downward in parallel. In this State V the RRBSS Segments ride out heavy weather in the posture of a "nun-shaped" navigational buoy. Again, in the interest of maintaining balance, the multiple RRBSS Segments interlinked in radial fashion will generally be trimmed in unison, so their facing pitch is equalized on all sides of the Interlinking Segment. Despite their very different outward appearances, a pair interlinked in linear fashion may be considered abstractly merely a special case of interlinking only two RRBSS segments in radial fashion.

In all preferred embodiments of this invention, RRBSS Segments are extensible along their primary axis by means employing nested or otherwise telescoping elements. Under clement conditions, RRBSS segments begin their lengthening upon attaining State H, and thereby enter a further state called the Horizontally Extended State, or more briefly, State H-EX. Essentially RRBSS segments fulfill two purposes: 1) providing levers transferring the energy causing their oscillation to be concentrated at their pivoting end, and 2) providing platforms for shuttling in opposite directions elements contributing to floating or sinking. State H is reached once the buoyant elements travel to lift the submersible end of the segment causing it to fully surface while the weighty load have been moved the other way to the pivot end; State H-EX is the next stage provided the floats have means for continuing their journey yet farther in the same direction. Useful nomenclature denominates the portion of the RRBSS that will attain State H without extension as Semi-Submersible Segment Upper Arm, and the nested elements that allow further extension as Semi-Submersible Segment Forearms. Of course lengthening the segment increases the mechanical advantage just like adding a length of pipe to the long end of a simple lever. Increasing mechanical advantage is a useful strategy for concentrating enough force to drive power conversion equipment even from very mild seas. But more is involved. Increasing length enables the submersible end to reach higher or lower on the swell. Complex harmonics come into play, since the segment's mass causes it to rise and fall slightly out of phase with the wave in which it floats, and the segment's momentum exaggerates or partially cancels out some of the wave's motion depending on the resonant characteristics of their relative phasing. The adjustable length segment can be tuned or detuned by selecting on the fly a length at which desired additive or cancelling harmonics occur. Dampening to prevent overstress becomes feasible even in State H-EX under certain conditions. In open ballast and float systems mass and buoyancy are not held constant, so added water ballast and/or air buoyancy offer additional options for harmonic tuning as well. Tunable closed ballast and float systems rely on redistributing load over a lengthened or shortened segment while keeping the mass of the segment constant, but are deemed equally capable of efficient tuning.

As previously noted, segments interlinked in linear fashion with two degrees of freedom will snake through the water hewing to the troughs of swells under the influence of gravity as well as ride up peaks and down troughs producing oscillation in two approximately perpendicular planes. Prior art offers the valuable technique for harmonic tuning of selecting between the two planes of articulation according to ocean conditions and the amplitude and frequency of swells, but the apparatus of the present invention significantly extends the range of options in this vital area of tuning. To the extent extended RRBSS segments span from peak to peak of swells, they will tend not to perform much useful work on the perpendicular plane as they bridge over troughs and plow through peaks. To the extent they can be trimmed to half that length, output on that same plane may be optimized. Apparatus of the present invention interlinked in radial fashion with two degrees of freedom also will exhibit the tendency to slide into the troughs around swells passing underneath as well as to ride up and down the swells. The imaginary circle in which the submersible ends of the RRBSS segments could be inscribed when in state H-EX viewed from above over flat water becomes compressed into a pulsating oval to the extent it is squeezed into valleys around passing swells, and this produces oscillations in the surface plane. So once again, adjusting the length of the RRBSS segments will help determine the relative degree to which energy in passing swells will be converted into mechanical work on the two planes approximately parallel and perpendicular to the water's surface. Since the name of the trimming game is squeezing out as much usable power as possible when one can by fine tuning, and letting up by detuning when any more would be too much, the extensible length of the RRBSS segment in State H and State H-EX is a key aspect of the apparatus of this invention in all its preferred embodiments. Depending on the number of nested telescoping forearms, the RRBSS may be capable of increasing its length several fold, and consequently its area many fold. The straight-line extensibility of the RRBSS after it reaches State H squares the power output possible in lackadaisical seas for each doubling in the length of the extending sub-Buoy length.

Those skilled in the art will recognize that there are many ways apparatus embodying the invention can be configured to radically reorient, extend and retract, both in terms of drive and transmission types and in terms of where such critical components are situated, since these can be rather freely allocated among the RRBSS segments and the various respective interlinking segments. The preferred embodiments detailed here incorporate dual servomotors of two different types on each RRBSS segment. The motors are located near the pivotal ends for the segment. One system utilizes wired electrical motors powered from rechargeable batteries located in the "Interlinking Segments". The second parallel system is of a standard hybrid pneumatic-hydraulic type, with power stored in a pressurized tank again located in an Interlinking Segment, and transmitted via hydraulic lines to the RRBSS segments linked with to it, driving hydraulic motors. If the main mechanism gets somehow fouled or stuck, the availability a high-torque bursts of power from the back-up system may be just what is required to restore working order. Pressured pneumatic tanks are deemed suitable to store and supply plentiful power for such purposes. Since all embodiments of the invention call for at least one buoyant segment, there is always ready access to air to replenish the tank. Furthermore, since randomly occurring higher swells will impose forces on RRBSS segments in excess of what the secondary conversion elements are capable of turning into usable power, Shock Absorbing Members located in the variably facing restrictive shoulders are specified. Pressurized air from the shock absorbing members is thus produced which can do double duty by refilling and topping off to capacity the pressure tank.

With advancements in the atmospheric and computer sciences, average conditions at sea can be modeled and predicted with increasing accuracy on the macro level, but on the micro level, which is to say the very local environment in which this apparatus must work and survive moment to moment day in and day out, this is not proof against suddenly arising, potentially destructive peaks and surges of energy sometimes produced by unpredictable confluence of waves from several directions, wind, current, collisions, tsunami or unexpected wash effects. It follows from this that preferred embodiments of the invention are required to have more than just the capacity to be Right-Angularly trimmed: survival dictates they must have the capacity for the trimming in emergency situations for that to be accomplished very rapidly. By "very rapidly" is meant ideally quickly enough that when one seriously overstressed component RRBSS segment signals danger, the rest of RRBSS segments comprising the same apparatus should be able to retract or duck lower in the water enough to avoid preventable damage. In preferred embodiments, dual systems running in tandem when time is of the essence are offered as a practical solution against such eventualities, with the pneumatic-hydraulic parallel system giving the occasionally needed extra "kick".

These explosive surges that call for fast trimming imply the need for robust transmission mechanisms to produce the transitions from state to state. Transmission from RRBSS segments motors is consolidated in preferred embodiments for both righting reorientation (movement back and forth between State V and State H through State T) and for extending or retracting to or back from State H through state H-EX. While several feasible approaches suggest themselves to those skilled in the art, the preferred embodiments detailed here utilize a push-pull chain rather than the much more familiar circular chain found on motorcycles for the linear acceleration of ballast and floating elements. Motors are located close to the pivotal ends of the segment in the interest of not unduly weighting down the submersible ends in State H and State H-EX, but most of the chains' length coils up into canister-like magazines at the submersible end, their weight in that position contributing to sinking in State V. Beginning from State V, as the motors drive the chain out, float elements are pushed toward the submerged end, raising its pitch until State H is reached. Continued outward movement of the float serves to begin telescoping out the RRBSS Segment's forearms as it enters State H-EX.

In its preferred embodiments each individual unit of apparatus is provided with the sensing, measurement, computational, response and communications capabilities to operate within an array or matrix as a networked device. The frequency of swells is clocked. The amplitude and direction of swells are measured. The precise degree of trim over time is recorded. Exact physical location is verified by GPS. Power output over time is recorded, as are excess energy or shocks that are absorbed, stored or spilled without immediate productive use. Common maritime weather measurements of wind strength and direction, air temperature, barometric pressure, water temperature, current strength, current direction, and so forth, are taken.

The data from these several measurements is, in the first instance, available for automated use within the unit generating them. For other units in the network, though, the data preliminarily correlated and distilled at the individual apparatus level is compacted into the form of information of potential utility not only to itself but also to other units of the matrix or array, to the entire matrix, or indeed to other matrices in the region. This rich trove of information derived from a single apparatus about the current, ever-changing time-plotted sea state at a precise locale is not to be misconceived as an accidental byproduct subordinate to achieving power production by individual units of apparatus of the invention. Rather, it is to be understood as a major targeted informational resource intended to be pooled, thus providing means for coordinating the trim of all the devices comprising the array with the express objective of achieving performance optimization at the network level following principles from the field of stochastic control.

Where sensory, afferent, efferent, cognitive and motor functions are integrally related, as in a living individual, there is never a difficulty in defending the adage that the whole is much more than the sum of its parts. The preferred embodiment of the present invention calls for multiple units to be deployed in arrays effectively constituting an integrated system, rather than a mere aggregation of independently operating, freestanding parts. A few further biological analogs may help understanding corollaries of this key concept. Wildebeests in a herd present more than a forest of sharp tipped horns to discourage a would-be predator: they comprise a collective multiplicity of eyes, ears, and nostrils to detect the predators' presence and often location. The pooling of sensory information affords arrays of the present invention early warning from remoter locations, as well as the capacity to calculate the nature, power, and immanence of threats, including timing and direction. It takes but one feeding water bird becoming aware of a danger to induce the flock to edge away from the potential threat, and then it takes only one bird out of the entire flock (now in a heightened state of alert) to become alarmed enough, sensing imminent danger, to cause all the birds in the flock, sometimes numbering in the many hundreds, to take flight together. It is well within the capabilities of existing technology for preferred embodiments of the invention to mimic such responsive behavior when arrayed in matrices. Thresholds for subsequent response throughout the network can be cued to inputs originating from a single source first to detect impending changes which might affect other units in the network. The hive does not predicate its survival on the fate of any particular worker bee. In its preferred systemic embodiment, the matrix gains a way to survive very largely intact forces that could damage or even destroy its separate constituent units operating in isolation.

Individual units in preferred embodiments of the distributed network should be equipped to share data both wirelessly and via branch lines meeting in trunk lines, which are provided in any case for power take-off and can be readily utilized or "piggybacked" data transmission as well.

Because a many-to-many relationship subsists among individual devises of which the network is composed, the real time availability of such a superabundance of data from numerous points within an array presents both a major opportunity and a formidable challenge. The opportunity presented is to assemble a mosaic that provides an unprecedentedly fine-grained, dynamic picture of the complex sea state in the precise patch of ocean where dozens, and perhaps hundreds, of devices are making direct measurements as well as producing power. However, the challenge is to avoid letting the virtual representation of the complex natural phenomenon "drown" in the same immense sea of complexity as the changing sea state being represented. It is critical to observe that to a large degree the useful relevancy of the data generated by each individual unit of apparatus to others in the matrix is dependent on its physical position relative to the rest. From this it follows that the preferred method in terms of informational technology architecture at the matrix level is that of a distributed information system, with substantial computing power spread among all the apparatuses in the network.

When, in the preferred distributed information system, units in closest proximity receive digested information rather than streamed data, the informational economies are multiplied as they further digest that information before sending it to the tertiary units, and so on down the line. Each successive retransmission condenses matters concerning more distant units further, yet even the remotest networked units have a useful representation "in a nutshell" of the current state of every other unit, so the real time mapping of the sea state throughout the patch of ocean covered by the matrix of devices is accomplished. Fine grained information is localized where it is most needed, but the unitary apparatus avoids the pitfall of "missing the forest for the trees". Each unit, in effect, has a window offering distance perspective on the state of the entire matrix, and trimming can thus take into account the big picture as well as the immediate surrounding operating environment. Ease of expansion, scalability, robustness, and facility of repair are additional reasons for preferring a distributed information model as a method for networking apparatus of the present invention.

Within the distributed information framework, at the individual apparatus level three general types of trimming response programming protocols for Trinuning/De-trimming/Tuning/Detuning are arranged in hierarchal order according to their purpose, with any in a superior position overriding those below. At the bottom is the most common, default Routine Power Output Response Protocol: the gradual, step-by-step adjustments in trim to safely maximize power production. Superior to that is an Overload Prevention Response Protocol, which applies pattern recognition strategies to the same set of information. Scanning at this level, remote events, trends, vectors, and a confluence of factors are analyzed in order to timely identify and anticipate conditions and forces posing dangers of overloading an apparatus at its current level of trim and respond appropriately by detuning/de-trimming when thresholds are crossed. Once it detects the danger is past or dispersed, the Overload Prevention Response Protocol will revert control to the default Routine Power Output Protocol. The goal to optimize power production at the matrix level has implications for the network architecture: somewhat counterintuitively, it implies that it is not always desirable to preprogram individual units of apparatus safely to maximize their individual power output. For example, widely dispersed units at the periphery of the matrix may well have the thresholds for their Overload Prevention Response Protocol lowered, enhancing their usefulness as early warning devices for the matrix, at the small cost of lowering the units' separate power production. Unforeseen events causing, or hitting with of sufficient force to potentially cause, damage to an apparatus, will trigger an Emergency Shutdown Response Protocol, signally other units in the closest proximity to very rapidly shut down to State V, and elevating units next farther out into the Overload Prevention Response Protocol.

The complexity of the ocean dynamic is of such vast magnitude that even given greatly increased number sensing stations cooperating in a distributed information network as just described, predictive modeling reaching down to a very fine grained, localized scale remains hugely challenging. That is to say, knowing all one might wish about the present state of a defined small patch of sea does not always enable us predict its exact state or foresee anomalous events even a minute hence: not only for lack of perfect algorithms to model all the equations in play, but also for lack of computational means to solve them in real time even if one possessed them.

An advanced variant of the distributed information system described above is offered as a second preferred method of networking apparatus of the invention in arrays or matrices. Although promises and expectations frequently have outrun performance by an outsized margin since its origins more than 60 years ago, over the last decade and an half, the field of Artificial Neural Networks [ANN], once a subject mainly of academic and theoretical interest, has come into its own in terms of the burgeoning quantity and quality of genuinely utilitarian, robust applications, and this a trend for which there is no end sight. Prime tasks to which ANN applications are proving their worth include robotics, process automation, expert systems, pattern recognition, and time series prediction, all specifically relevant to the present invention and utilized in a preferred embodiment of methods for controlling arrays in which each apparatus constitutes a node. In a machine learning system, the weight assigned to each input at each node is adjusted based on outcomes both positive and negative. Gradually and over time, the network performs more optimally as it consequently becomes more sensitive to critical signals occurring in a sea of noise. For purposes of the present invention, this can be understood as trimming, occurring at the apparatus level, taken to the matrix level. The ANN approach potentially takes the information handling economies of the distributed information network a step further: informational inputs concerning certain other nodes can eventually be drastically abbreviated or even dropped as experience demonstrates them to be redundant, superfluous, counter-indicative, or otherwise not useful, analogous to the elimination of a plethora of unused or less valuable synapses in the developing human brain from childhood through adulthood, effectively allowing the system to concentrate on employing those interconnections that have proven themselves to work best.

Advances in global weather prediction, modeling, and space based monitoring, imaging and satellite relay make a centralized top level of trimming control desirable in preferred embodiments of the invention. This top tier can step in to override the distributed network and automated levels beneath. Certainly in case of some approaching extreme weather events, it will be advantageous to "batten down" units into State V in anticipation of the event rather than waiting for the indicators of the impending fury to register at the ground level. Such override capability is further desirable under certain contingencies to combat sabotage, terrorism attacks, or acts of war. Top level "big data" analysis of system performance, using advanced algorithms, statistical and modeling techniques, can be used as benchmark by which to evaluate other tiers of control. Eventually, developments in modelling the actual sea state and other areas of computing could make top-level control of on-going trimming at the device level a competitive alternative to distributed computing network approaches currently preferred.

An encrypted ship-to-apparatus command mode is also called for in preferred embodiments, to allow loosely tethered, free-floating embodiments of the invention to be folded into State V for repair and routine servicing. A grappling point is called for to allow lifting apparatus on board for repair, repositioning, or retirement from service. Retrieving large buoys where lively wave action abounds will be neither easy nor cheap. Consequently, all preferred embodiments of present invention permit them on command to be compactly aligned vertically in the water for easier removal. A lockdown apparatus is provided in preferred embodiments which holds units in State V so that sub-buoys will not swing freely when lifted out of or into the water. This will facilitate ships to off-load apparatus so it can sowed in a vertical position, and left there to spread out horizontally automatically shortly afterward according to swell conditions.

Many modern navigational buoys are designed for a 10-year life; however, energy converting buoys may be expected to require service at more frequently intervals and some experts have recommended a five year working life, involving millions of cycles. Since the energy source comes essentially free and without any major environmental costs, the main costs determining economic competitiveness to be anticipated lie in these areas: capital equipment, deployment, and operations. Replacement and service intervals will be critical variables; it is not just survivability but also service life involving considerations of wear and tear that the system's apparatus will have to be both designed and programmed to maximize. The tendering of buoys has always been a tricky, demanding, and sometimes dangerous job. Equipped for long voyages and with ice-breaking bows for winter, seagoing tenders are 180 feet [55 m.] long and able to lift up to 40,000 pounds [18000 kg.].

Properly implemented, the invention should be used to help rationalize, define, and separate shipping lanes. To avoid impediments and hazards to shipping, compound platforms should be equipped with all the signaling capabilities of navigational buoys, including light, sound, sonar and radar warning signals. This equipment will be located atop the Interlinking Segments which ride just above the ocean surface.

If executed with sufficient forethought, large scale applications of the present invention have the potential to positively impact fishing industries and to the diversity of marine life. Sizeable breeding reserves have been shown to help save and restore overstressed fish populations (particularly by helping shelter larger fish so important to fish population recovery.) At the end of their working life, decommissioned Compound Buoys could be scrubbed free of any harmful coating or fluid, towed to shallower depths, and scuttled so as to form artificial reefs, which have been proven to provide rich habitats for sea life. Saline ocean water is famously corrosive, but care should be taken in the selection of materials, coatings, and lubricants to insure compatibility with a healthy marine ecosystem. It is the inventor's considered view and fervent hope that this invention, true to its original purpose and intent, will be developed right from the start as an inherently peaceful, clean, sustainable technology for the very long term. Developments in International and Admiralty Law might be required to promote equitable exploitation of this tremendous natural energy resource for the worldwide benefit of generations to come.

THE FIGURES

FIG. 1: Right Angularly Reorienting Buoyant Semi-Submersible Segment horizontally connected to an Interlinking Segment in frontal view.

Figure 2:
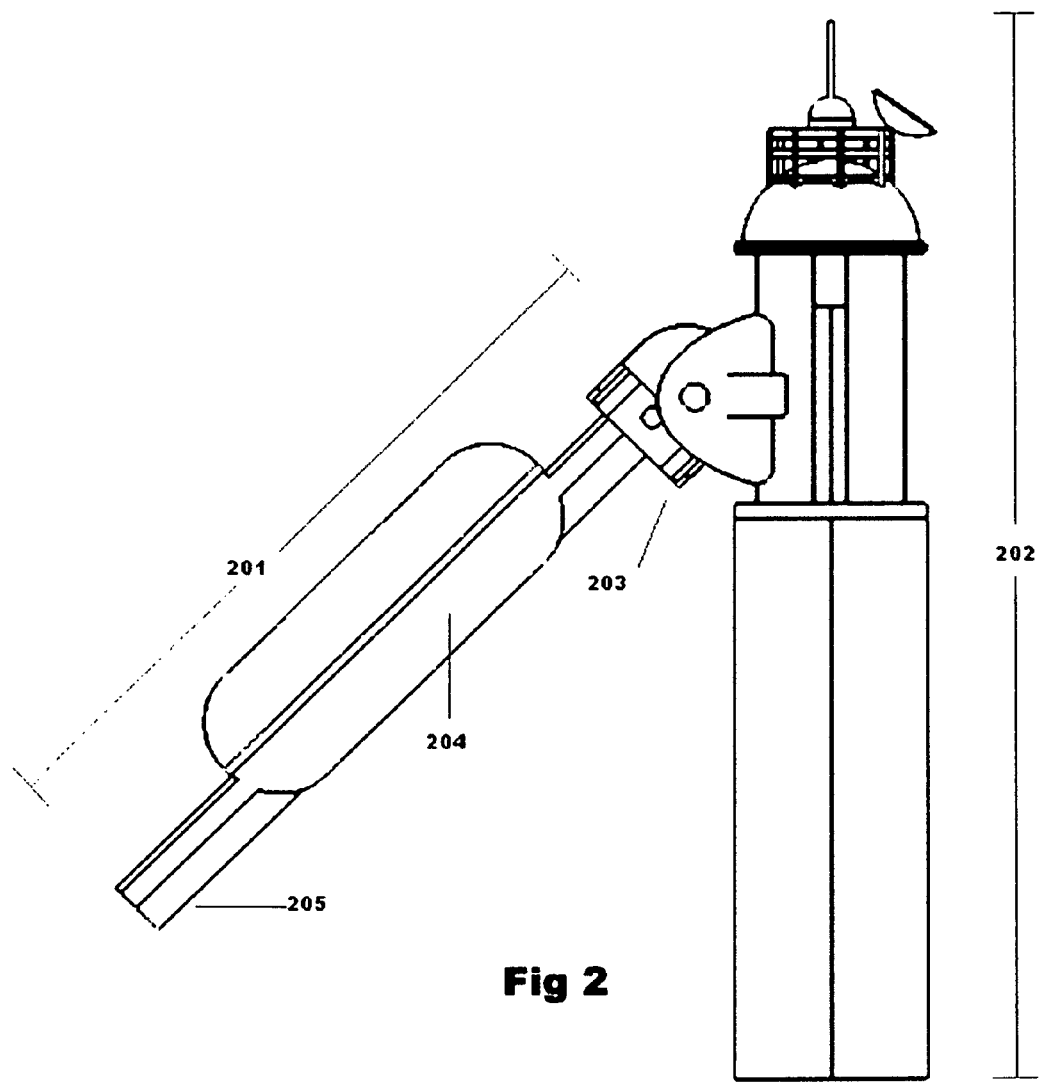

FIG. 2: The RRBSS Segment of FIG. 1 in transitional state with its outer end partially submerged seen in frontal view.

Figure 3:
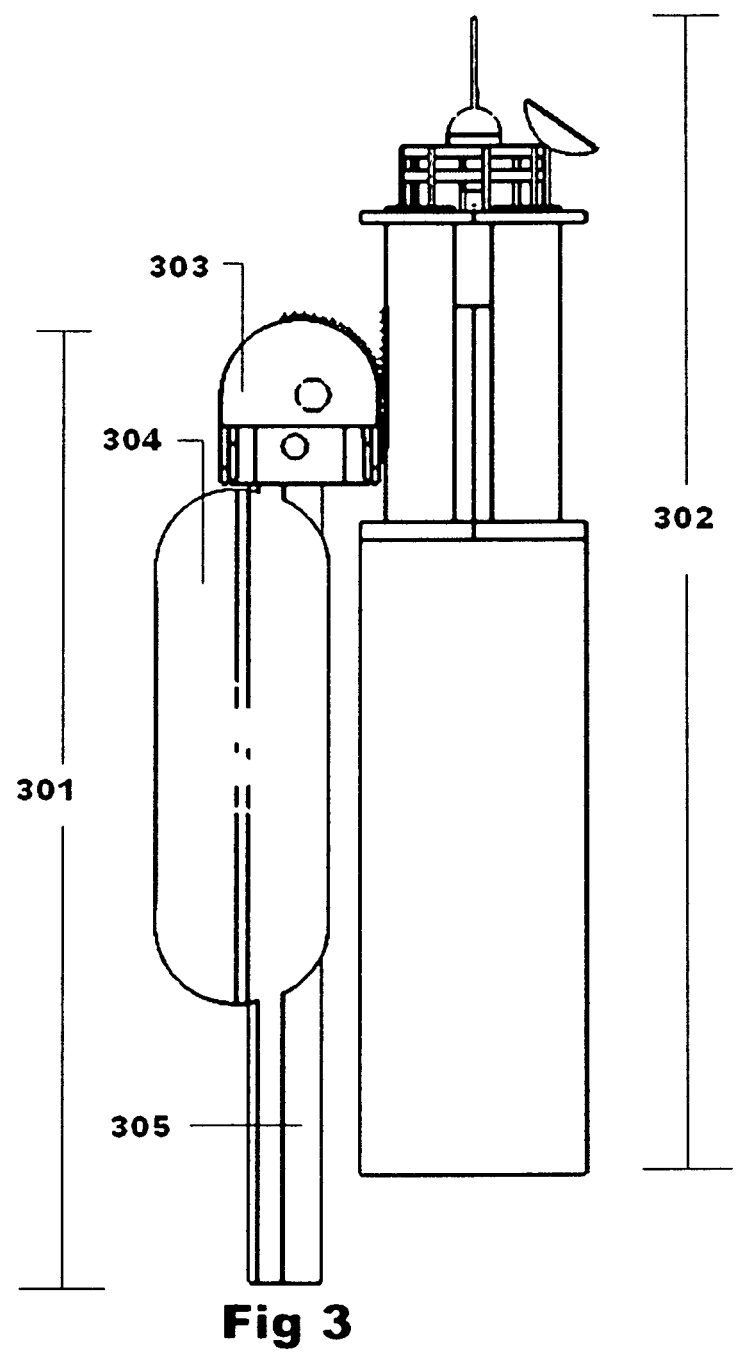

FIG. 3: The atomic representation of the apparatus of the invention with the Right-Angularly Reorienting apparatus of FIG. 1 and FIG. 2 in its vertical state seen in frontal view.

Figure 4:
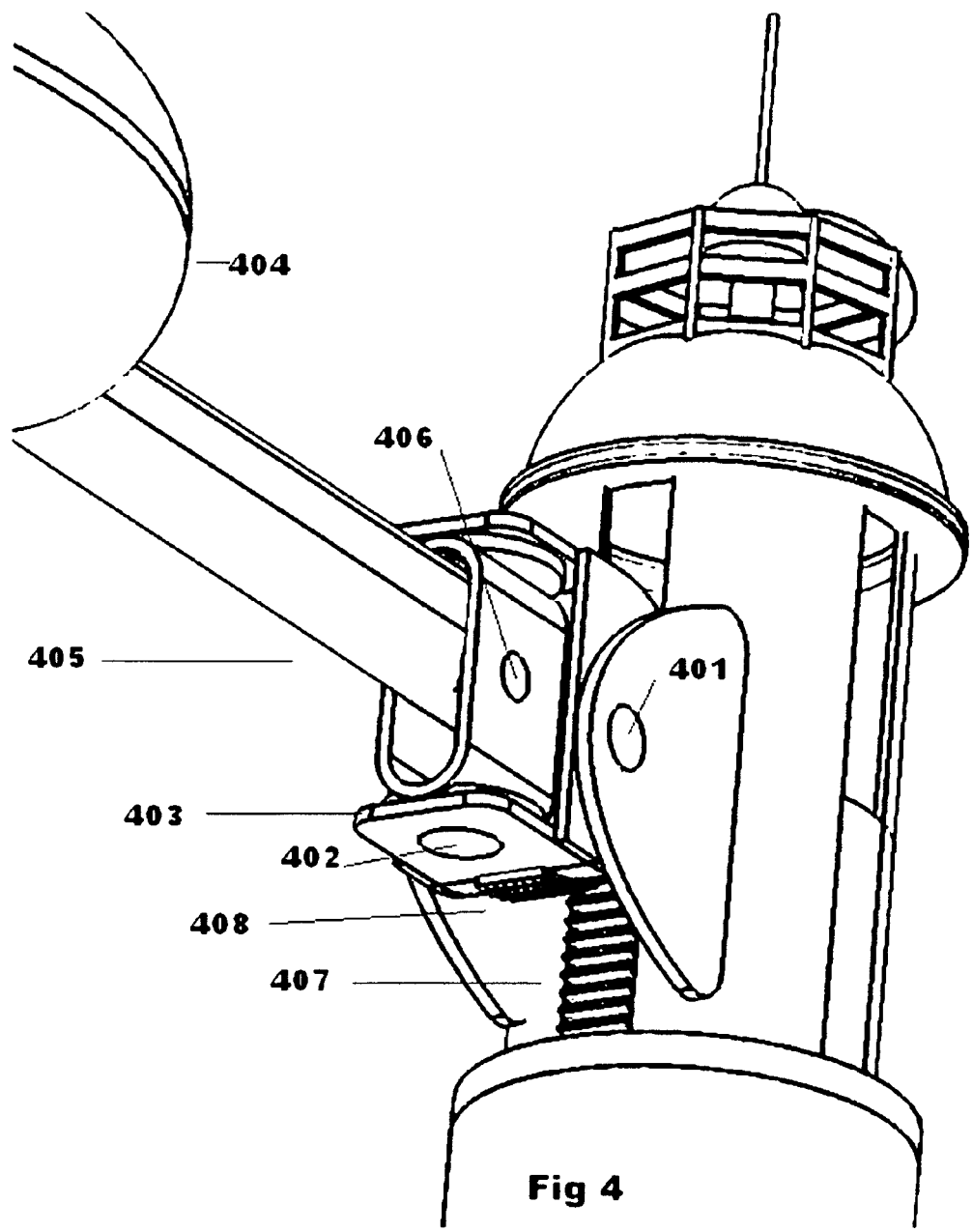

FIG. 4: Orthographic view of Variably Facing Restrictive Shoulder joining the Segments.

Figure 5:
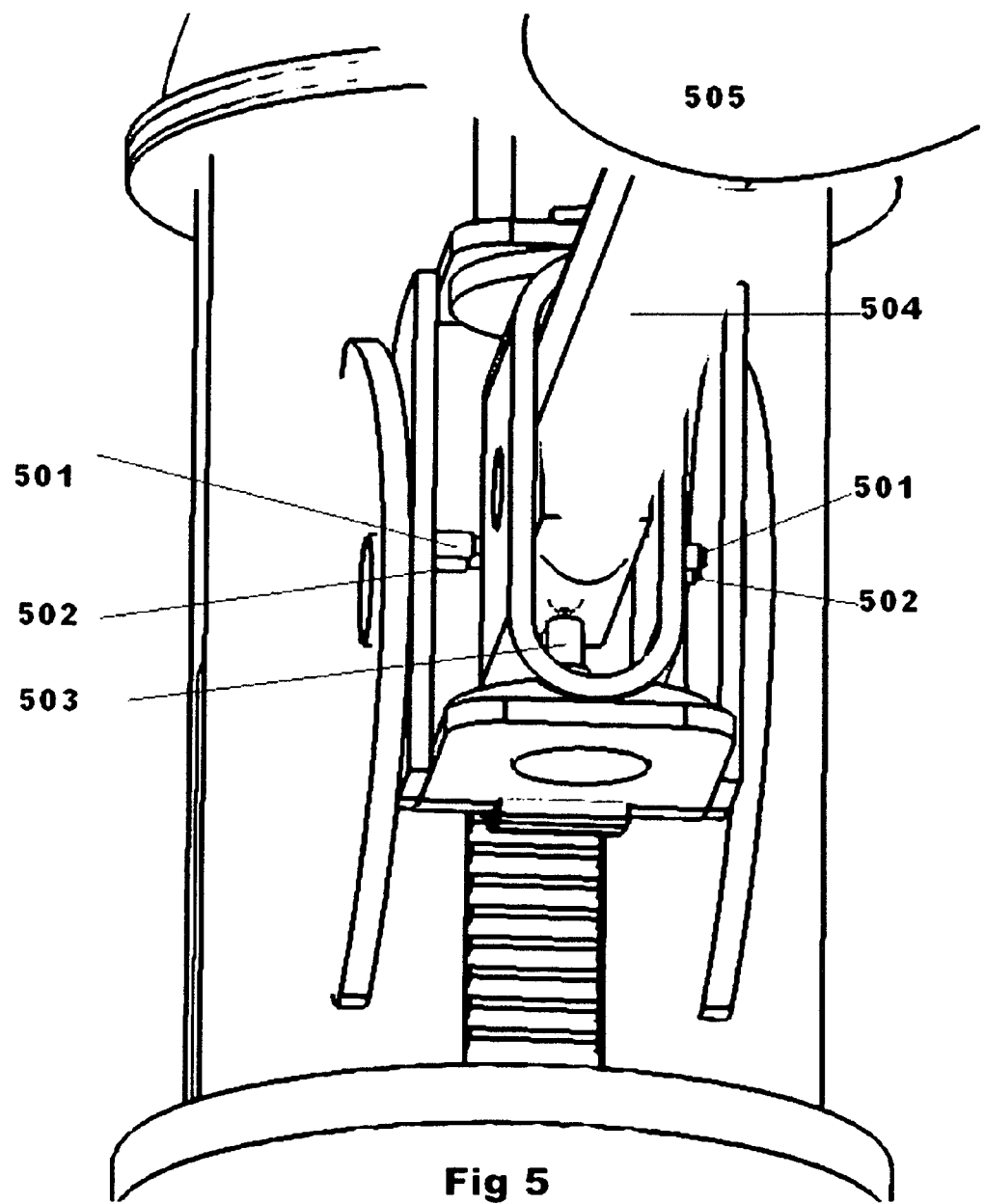

FIG. 5: Orthographic view of the object of FIG. 4 from an angle allowing to peer into the shoulder.

Figure 6:
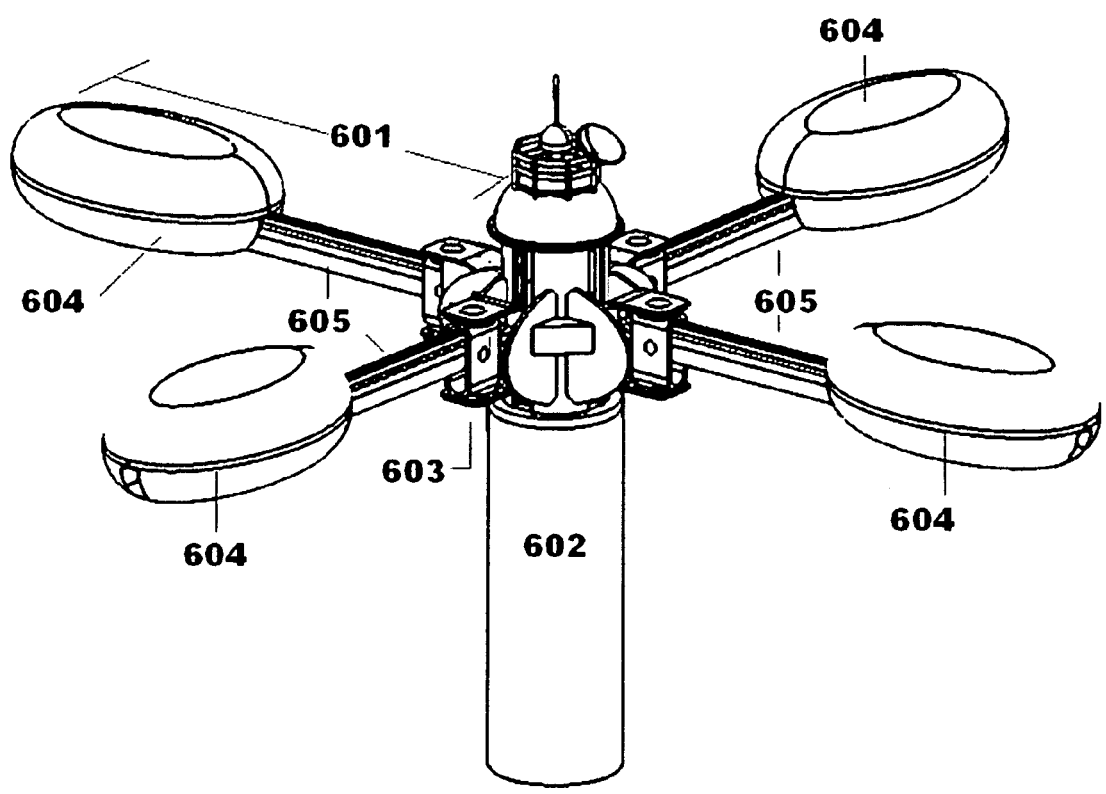

FIG. 6: Elevated orthographic view of a radially configured apparatus comprising 4 RRBSS Segments in horizontal state centrally connected to an Interlinking Segment.

Figure 7:
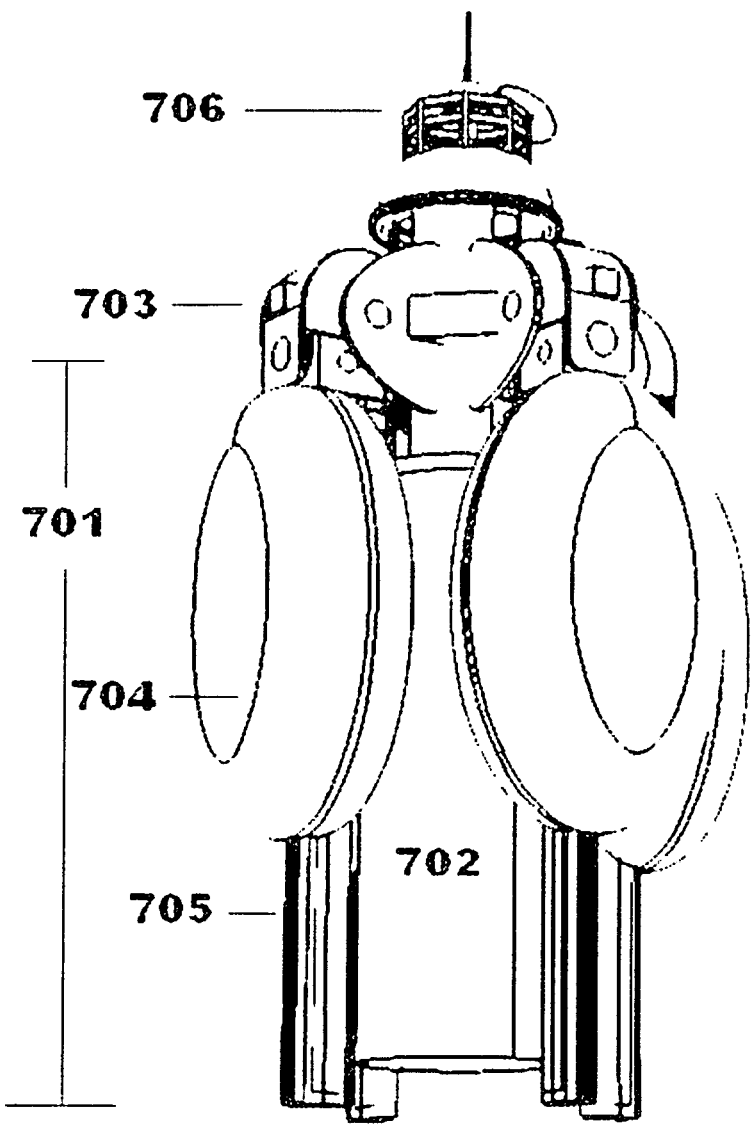

FIG. 7: Frontal water-level view of the radial apparatus of FIG. 6 with RRBSS Segments in the vertical position.

Figure 8:
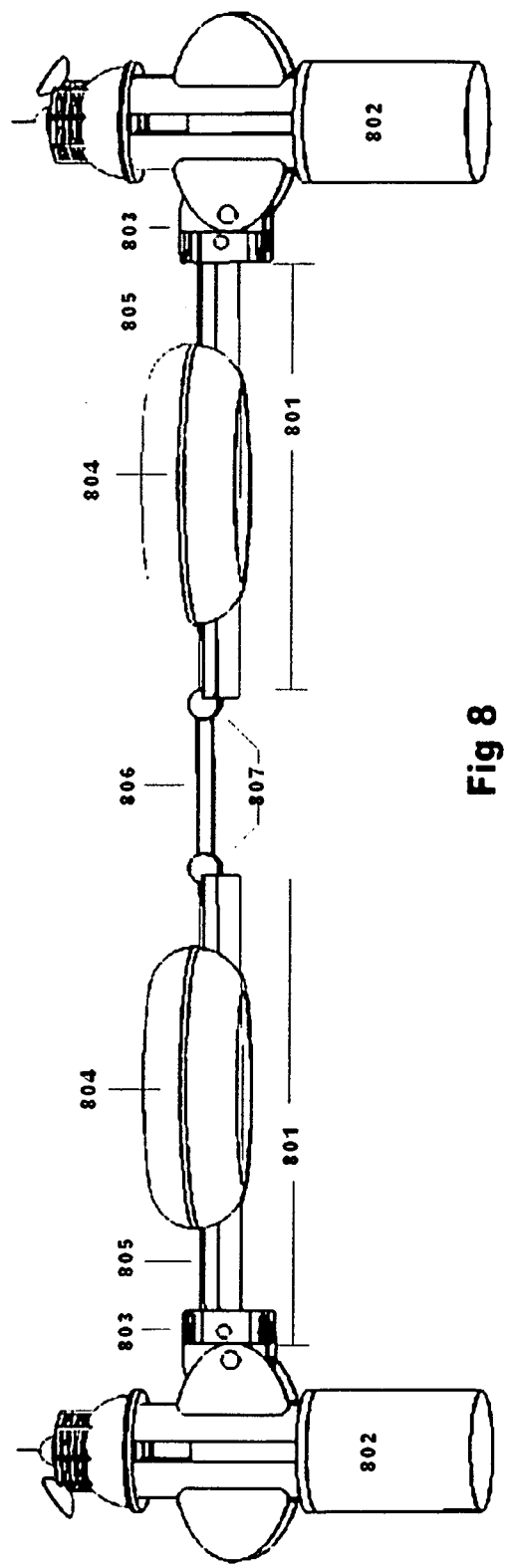

FIG. 8: Frontal water-level view of four segments in horizontal state and interlinked in linear fashion.

Figure 9:
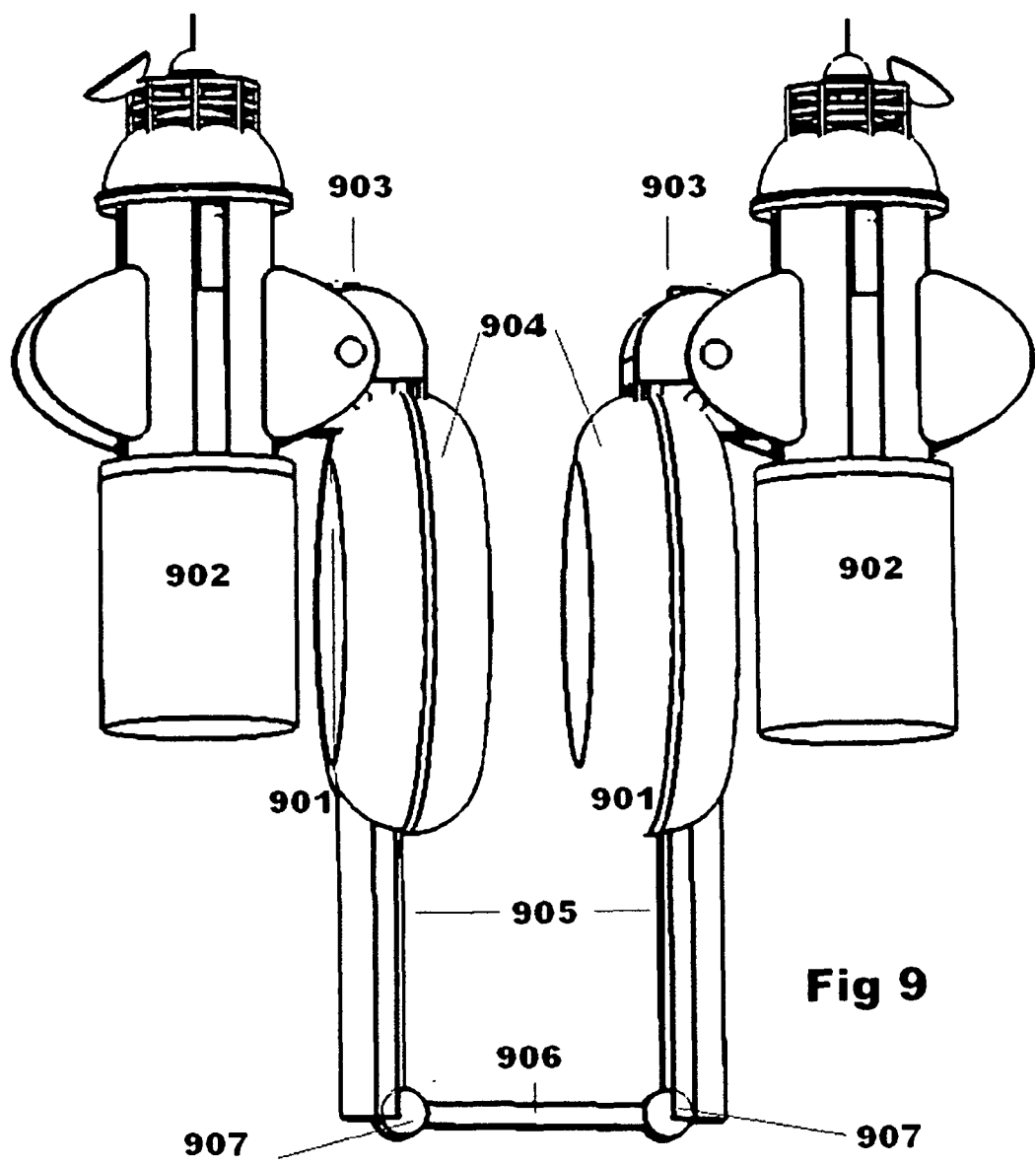

FIG. 9: The linear apparatus of FIG. 8 folded into its vertical state.

Figure 10:
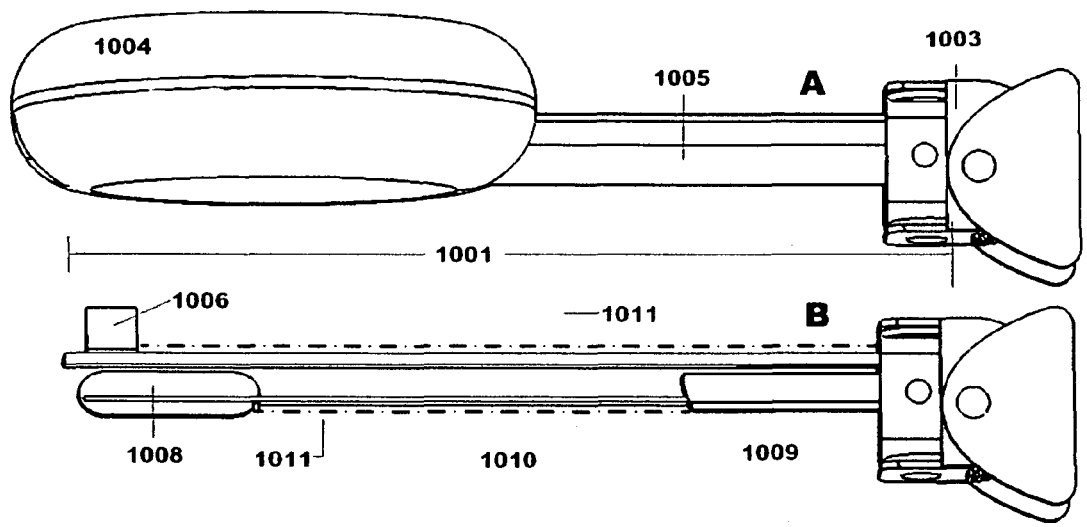

FIG. 10: The Right-Angularly Reorienting Buoyant Semi-Submersible Segment shown in its horizontal state both with [A] and without [B] the body coverings of the float and upper arm.

Figure 11:
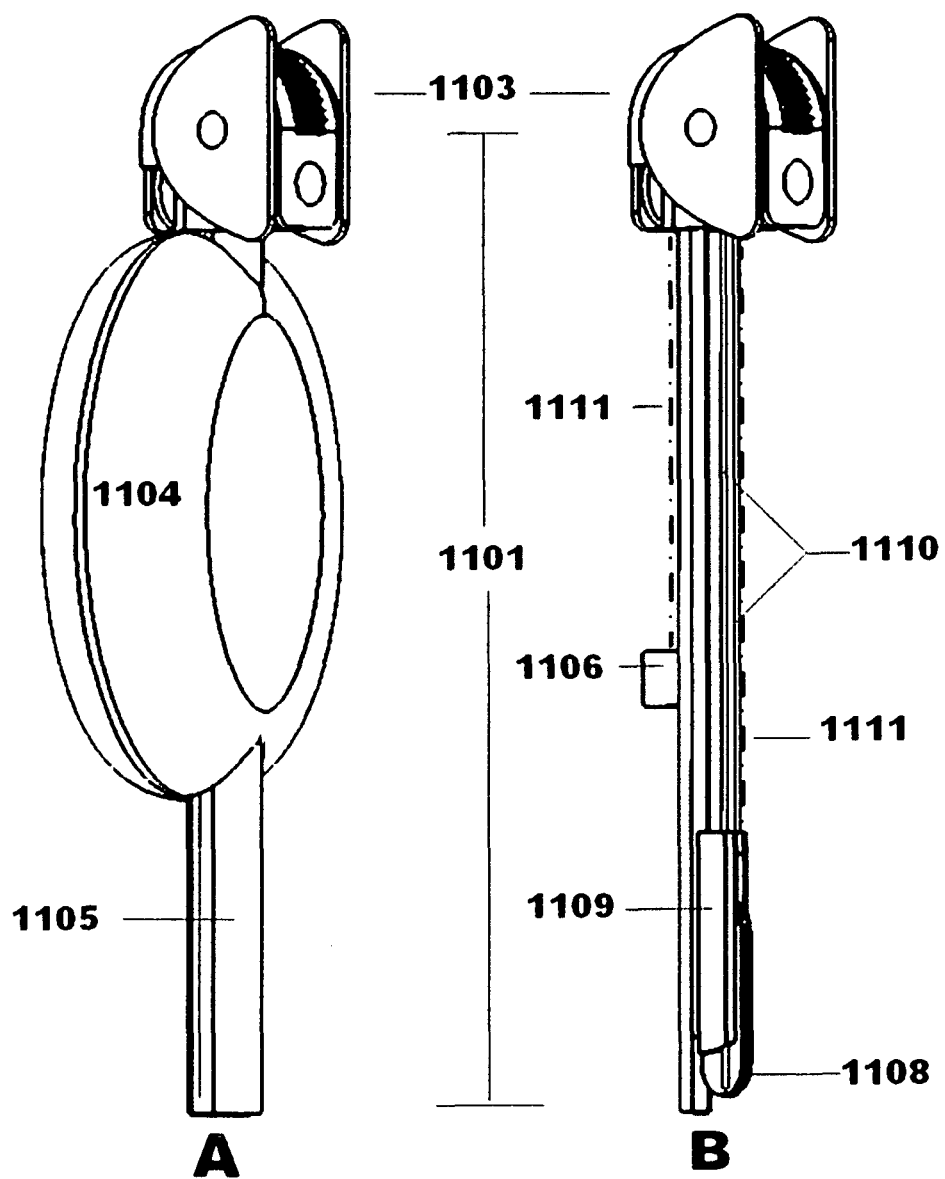

FIG. 11: The Semi-Submersible Segment of FIG. 10 depicted in its vertical state, both with [A] and without [B] the body housings for the float and upper arm.

Figure 12:
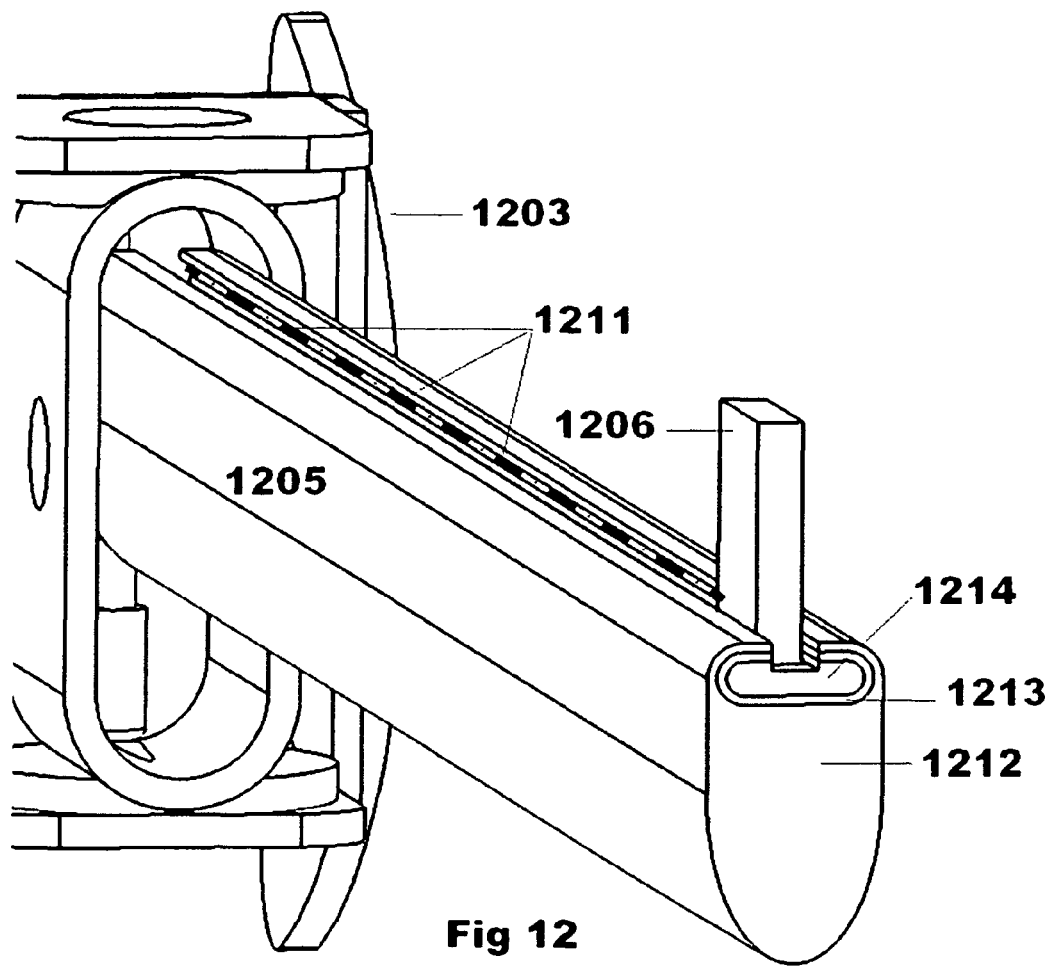

FIG. 12: An orthographic view of the object of FIG. 10 with float housing removed to reveal telescoping forearms nested within upper arm.

Figure 13:
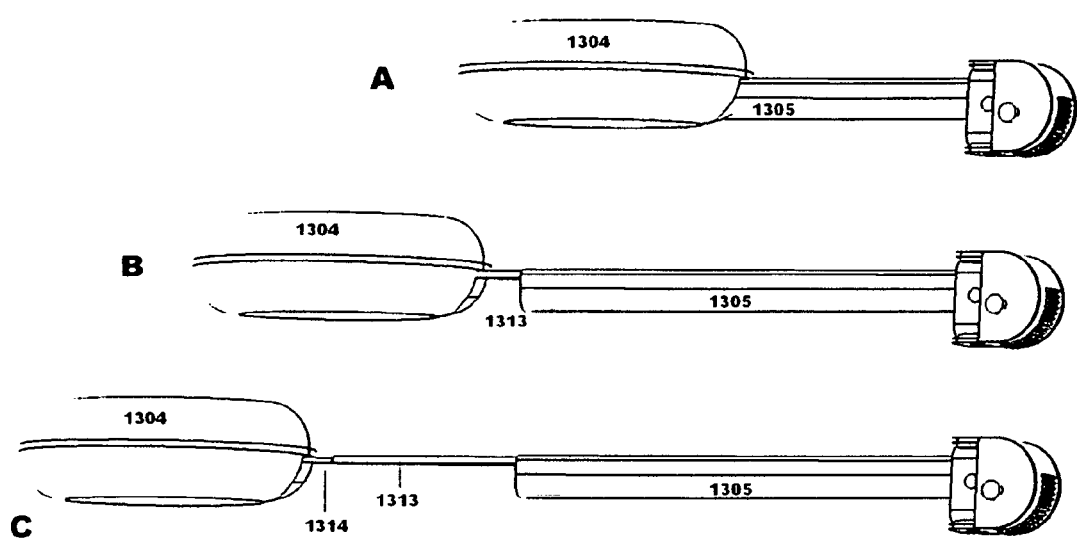

FIG. 13: The Segment of FIG. 12 in various progressive degrees of extended horizontal states: [A] not extended, [B] partially extended, and [C] fully extended.

Figure 14:
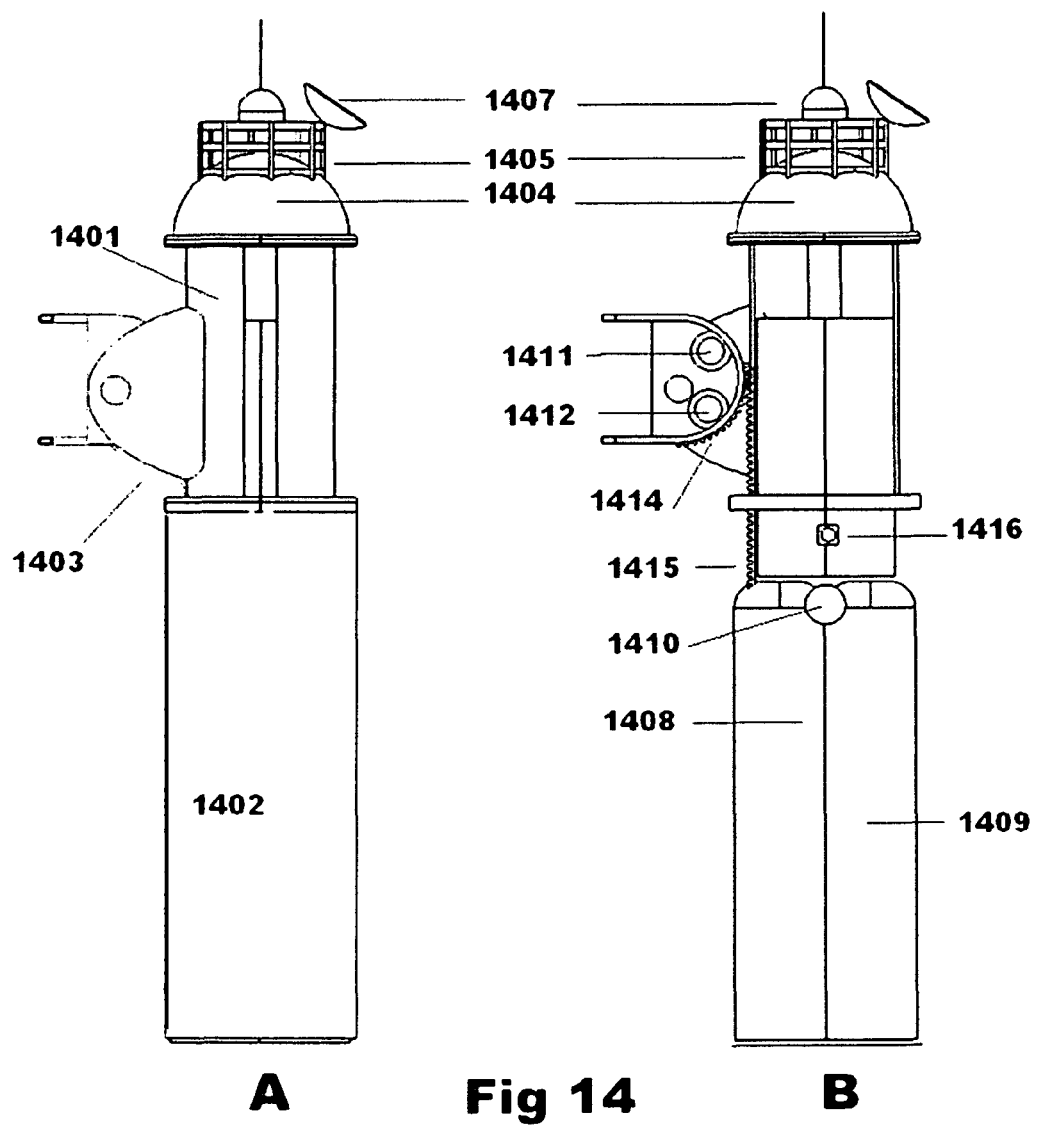

FIG. 14: Side view of an Interlinking Segment both with [A] and without [B] housing.

Figure 15:
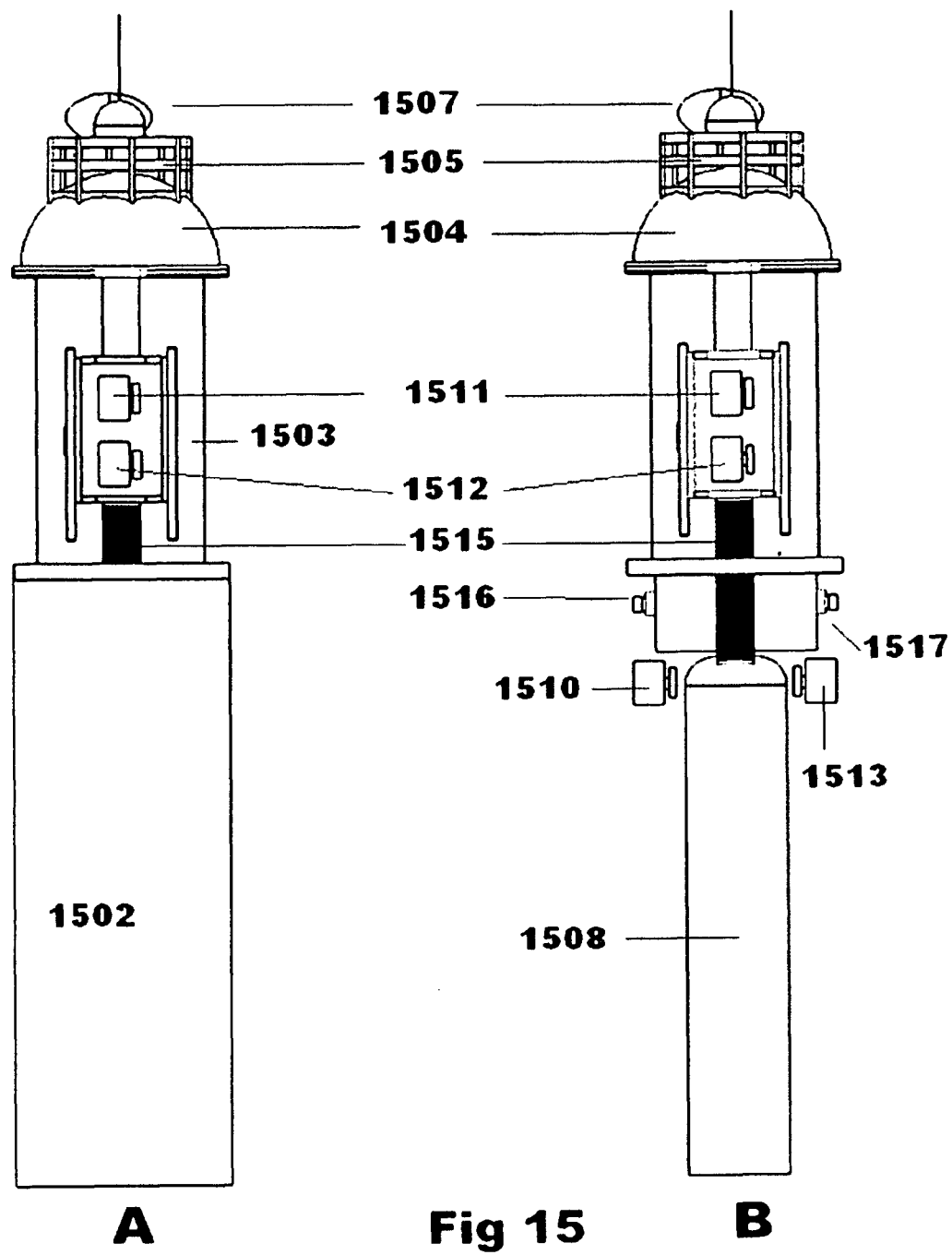

FIG. 15: Frontal view of the Interlinking Segment of the object of FIG. 14 both with [A] and without housing [B].

Figure 16:
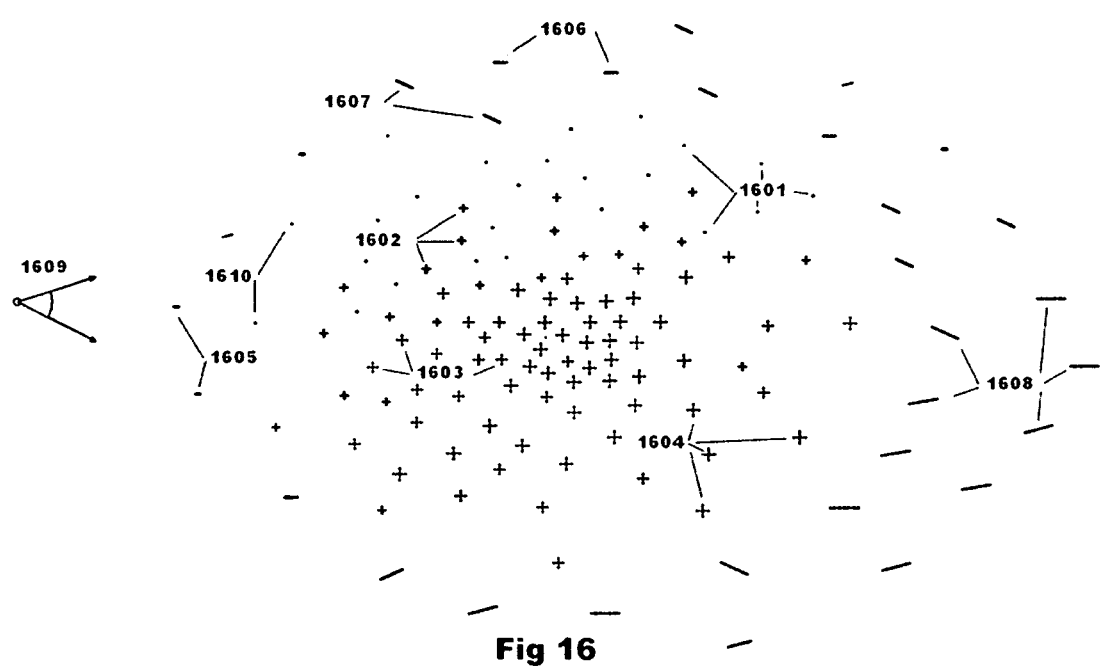

FIG. 16: Birds' eye overhead view of a matrix of the invention with various units and configurations of apparatus in various states of semi-submersion and horizontal extension.

Figure 17:
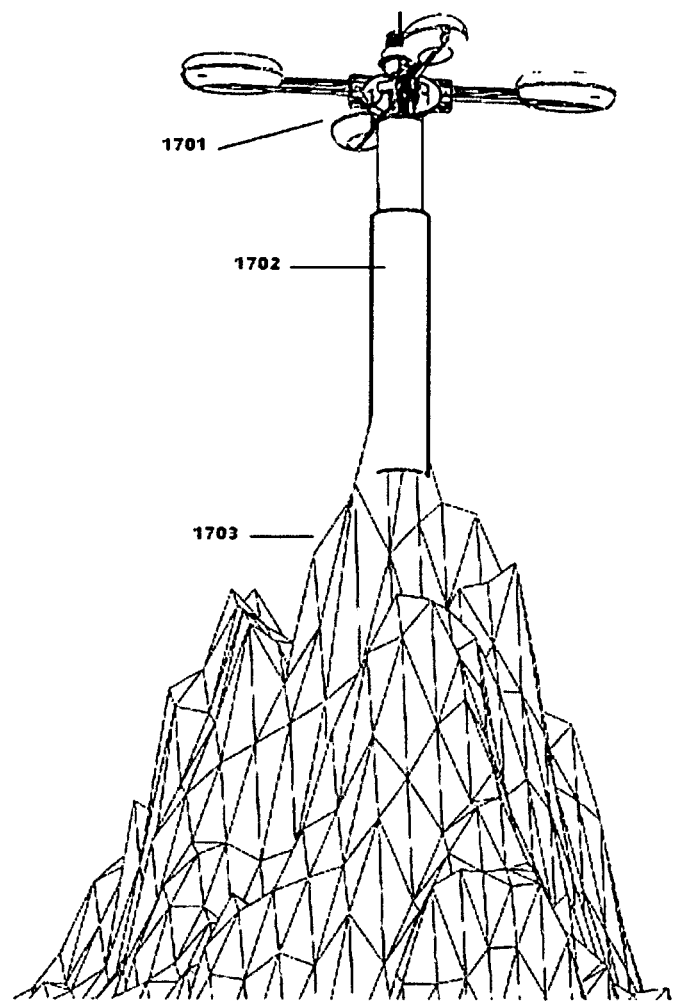

FIG. 17: Subsurface view of the apparatus of FIG. 6 with Interlinking Segment capable of tidal adjustment and vertically oscillating within a base rigidly affixed to a marine rock up-cropping.

Figure 18:
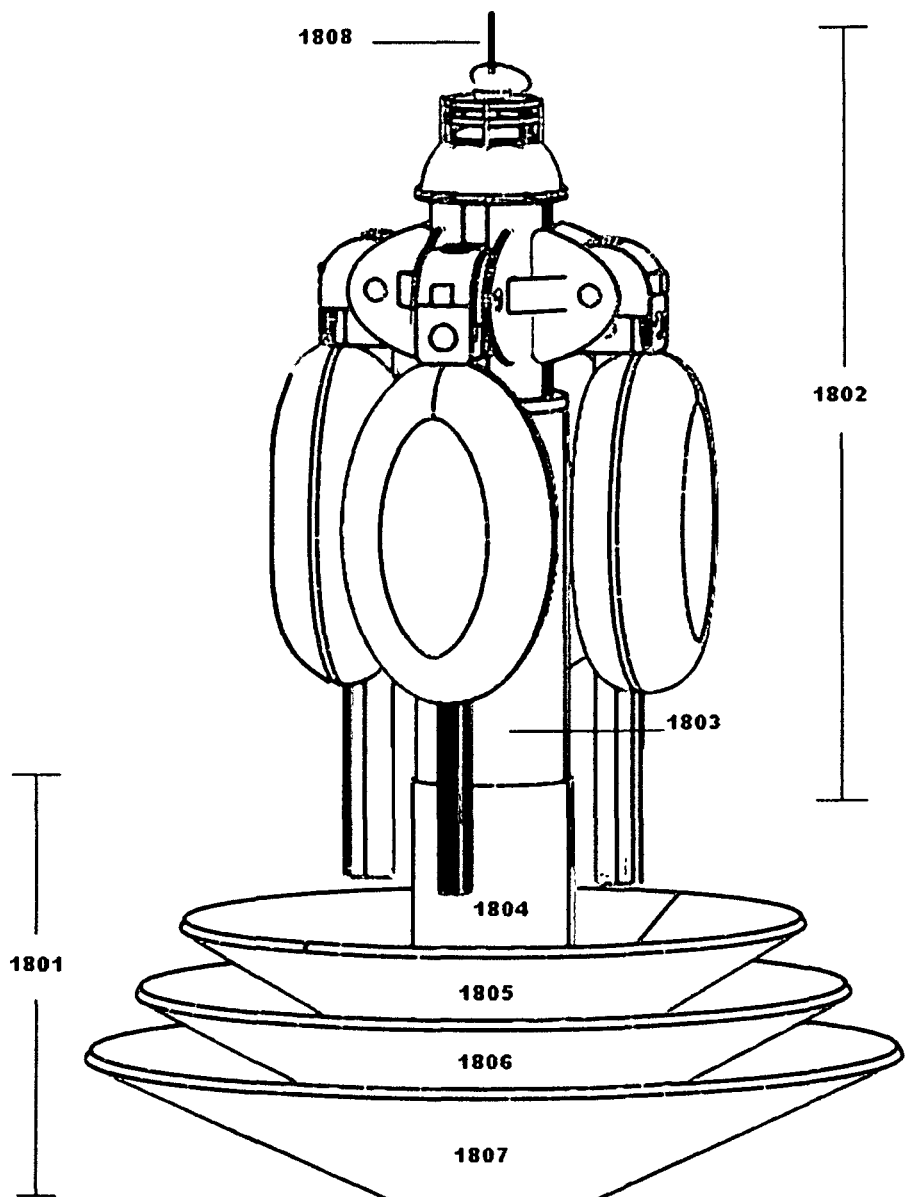

FIG. 18: Orthographic view of radial apparatus of FIG. 7 with the Interlinking Segment fitted with Reactive Mass and Downward Bias Frictional Collars to allow point power conversion even in the Vertical State.

DETAILS OF THE INVENTION

FIG. 1 represents right angularly reorienting buoyant semi-submersible segment 101 horizontally connected to an interlinking segment 102 via a variably facing restrictive shoulder 103. A buoyant float 104 is linearly accelerated along the primary axis of armature 105. This armature, called the sub-buoy's upper arm, actually contains one or more telescoping elements nested within it. These allow for the float to ride further out over the water's surface in the horizontal direction.

In FIG. 2 float 204 has been retracted part way back along forearm 205 toward the variably facing restrictive shoulder 203 connected to second segment 202, causing outer end of the right angularly reorienting buoyant semi-submersible segment 201 to partially submerge in order to cope with heavier seas. In this position segment 201 can still oscillate within the restrictive shoulder; however, forces are buffered due to the friction involved in displacing water, so this transitional state is primarily defensive. An even more protected posture is attained in FIG. 3, where float 304 has been retracted up forearm 305 to the restrictive shoulder 303 and lies close to the body of the second or interlinking segment 302. Oscillation is not meant to continue in the vertical state, where survival is the overriding objective. In some preferred embodiments the semi-submersible segment 301 locks via magnetic or mechanical means against the interlinking segment 302.

FIG. 4 offers a view into the restrictive shoulder 403. Two degrees of freedom are allowed in the preferred embodiment illustrated. Upper arm 405 oscillates on the plane perpendicular to the water surface and intersecting the imaginary line defining the primary axis of the interlinking segment.

The pivot point for this movement is labelled 406. A second degree of freedom occurs on a second plane approximately perpendicular to the aforementioned plane through pivot point 402, and this permits oscillation in the plane parallel to the water surface. The variably facing restrictive shoulder holds steady and firm while upper arm 405 oscillates. In FIG. 4 the facing mechanism is represented by a rack 407 affixed to a piston-like drum and engaged with pinion 408 spanning about 90 degrees and pivoting about axel 401, sufficient to orient the semi-submersible segment from the horizontal state shown in FIG. 1 through transitional state shown in FIG. 2 all the way to the vertical state shown in FIG. 3.

FIG. 5 gives an alternate view of the object of FIG. 4 from an angle that lets on see pairs of pumps 501 & 502 driven by the oscillation of Upper Arm 504 on the horizontal plane. In a preferred embodiment of the invention, a dual internal power source is called for, with a pneumatic system backing up the primary electrical system. Taking pumps 502 as an example of a key element of the pneumatic system, functional overloading will permit 1) shock absorption; 2) pressurized air tank replenishment; and 3) measurement of excessive forces. In this scheme, pumps 501 represent key elements of a hydraulic system is used to drive turbines for power conversion. Similarly, hydraulic pump 503 is placed so as to be driven by oscillation in the approximately perpendicular vertical plane, and in a dual internal power scheme will employ one or more shock absorbing elements, which are eclipsed from view in FIG. 5. When operating in the automated response control mode, normal readings from load sensors will normally cause gradual adjustments, if any, in orientation; however, when excessively out-of-range loads are registered, that will trigger an immediate and rapid retreat into the fully vertical posture previously shown in FIG. 3.

FIG. 6 gives an orthographic view of a plurality of right angularly reorienting buoyant semi-submersible segments 601 with their respective floats 604 riding arms 605 configured radially around interlinking segment 602. Because it is desirable for balance in the combined apparatus that all variably facing restrictive shoulders 603 incline to the same degree in unison, in the preferred embodiment illustrated all four 90 degree pinions are driven by four racks affixed to the piston-like drum (identified earlier in reference to FIG. 4). As the piston-like drum is propelled upward, the attached racks drive the facing direction of all the variably facing restrictive shoulders downward simultaneously and by the same degree. Taken to its limit, the radially configured combined apparatus of FIG. 2 attains the state shown in FIG. 7: Folded downward from restrictive shoulders 703, the arms of the semi-submersible segments 701 with their floats 704 riding arms 705 face down parallel to the primary axis of the interlinking segment, and the floats form a solid phalanx all around the upper middle portion of the interlinking segment 702. The classic nun shaped profile, which has proven itself over centuries in the field of navigational buoys, could not be more pronounced.

FIG. 8 provides a view of apparatus of the invention configured in linear fashion. Two right-angularly reorienting buoyant semi-submersible segments 801 are joined at their submersible ends by fully submersible interlink 806 with one or more degrees of freedom provided at hinge points 807. In preferred embodiments of the invention power conversion apparatus such as hydraulic pumps are located at these hinge junctures as well as in the variably facing restrictive shoulders 803. As floats 804 retract along their respective arms 805 toward their shoulders, the Semi-Submersible Segments with their common submersible interlink go beneath the water surface. Please note that this brings buoyant interlinking segments 802 closer together until the vertical state shown in FIG. 9 is reached. Segments 902 can be used buoyant interlinks on longer versions of the combined apparatus simply by adding additional paired segments to the linearly configured chain. Even when battened down to so defensive a posture as shown in FIG. 9 with semi-submersible segments 901 locked in vertical position with floats 904 as far as they can travel up forearms 905 against restrictive shoulders 903, the combined apparatus will continue to convert wave energy to usable power in very stormy, chaotic and choppy seas, since relative motion will drive pumps at the hinged ends 907 of submersible interlink 906. In effect the two pairs of segments with oscillate like two spar buoys bobbing up and down and snaking to and fro out of phase, with energy made available by the mechanical work performed at their junctures 907.

The internal workings of a preferred embodiment of a right-angularly reorienting buoyant semi-submersible segment are shown in FIG. 10 [B] by removal of the float housing 1004 and the upper arm housing 1005. A magazine 1008 stores the coiled portion of a drive chain 1011 of the push-pull type. Bracket 1006 to which float 1006 is attached is accelerated in a straight line along the primary axis of the upper arm in either direction. To attain the horizontal state illustrated in FIG. 10, the bracket moves to the end of the upper arm, while counterweight 1009 travels along twin guide bars 1010 as far as possible toward the shoulder 1003. The counterweight conveniently may be U shaped, as shown in FIG. 11 [B] as 1109, so that it envelopes the magazine 1108 when helping to sink the submersible end of the segment in order to assume the vertical state. The weight of the chain taken up in magazine 1108 as a result of moving bracket 1106 and its attached Float 1104 along forearm 1105 next to the shoulder increases mass at the segment's free end, adding to the of the counterweight repositioned at that same end. The result is to cause right angularly reorienting buoyant semi-submersible segments 1101 to fold down from restrictive shoulders 1103.

Telescoping, nested "forearms", which are elements within upper arm assemblage 1205 (extending in horizontal direction from shoulder 1203), provide means for extending the length of arm of right-angularly reorienting buoyant semi-submersible segments, as shown in FIG. 12. Weather permitting, when bracket 1206 has reached the end upper arm 1212 further extension occurs as nested forearms 1213 & 1214 are pushed farther out by the linear drive mechanism represented as push-pull chain symbolized by the dash dot line 1211. FIG. 13 [B] shows middle forearm 1313 emerging from the upper arm 1305 to yield an intermediate extended horizontal state. Once the middle forearm reaches its maximum extension, one or more nested forearms 1314 can carry float 1304 still father out across the water surface. In brief, altering length changes the natural resonance period the apparatus, providing means for tuning or detuning to the prevailing sea state.

Interlinking second segments, such as the independently buoyant interlinking segments shown in FIG. 14 both with [A] and without [B] housings 1401, 1402, and front Shoulder Bracket 1403, deserve a closer look, particularly since many important functions of the apparatus may be conveniently located aboard them. This includes such telecommunications and visual and auditory warning equipment (beacons, flashing lights, bells, whistles, etc.) as represented by 1407, in addition to computational, data storage, and navigational equipment such as GPS located in capital position under hood element 1404. Grate 1405 is suggestive of the sort of grappling point tenders will need when servicing apparatus. 1411 represents an electric servomotor and 1412 a pneumatic servomotor within the shoulder, and these together constitute the linear drive mechanism for the push-pull chain employed in a preferred embodiment. FIG. 14 affords a good side view of pinion 1414 engaged with rack 1415. This rack, and several others located on the common cylinder-drum, may be driven by motor 1410, one of two such servomotors utilized in a preferred embodiment. The drum is held in place by clutch and brake mechanism 1416, again only one visible out of a pair in a preferred embodiment. Areas denoted 1408 & 1409 are where air pressure tanks as well as battery packs might be best located, as well as providing buoyancy to the interlinking segment.

Because several elements of the interlinking segment occur symmetrically in pairs for purposes of balance or reducing problems with binding, giving the Interlinking Segment of FIG. 14 a quarter turn clockwise on its primary axis, FIG. 15 brings some of these elements into sharper relief in profile. [FIGS. 14 and 15 bear corresponding parts numbering: 1502, 1503, and 1504 again representing housings and brackets; 1507 communications equipment; 1505 grappling grate; 1508 air pressure tank (eclipsing 1409, battery pack behind it).] Thus one can see servomotors 1511 & 1512 used for linear drive in the right-angularly reorienting buoyant semi-submersible segment, servo-motors 1510 & 1513 used for driving the cylinder-drum with its racks, and facing clutch and facing brake mechanisms 1516 & 1517.

FIG. 16 a gives a bird's eye iconic view of a matrix of apparatus radially configured apparatus in various states. Icons 1601 shows radially configured apparatus of the invention in the vertical state. 1602 points to radial units in the horizontal state; 1603 radial units in the partially extended horizontal state; and 1604 radial units in the fully extended horizontal state. Similarly, 1605 indicates linearly configured units in the vertical state; 1606 linear units in the horizontal state; 1607 linear units in the partially extended horizontal state; and 1608 linear units in the fully extended state. 1609 indicates historically prevailing wind and wave directions. The icons representing identical devices in different states and the two configurations are drawn roughly to scale, so FIG. 16 gives an impression of the high ratio of the exposure in the extended state compared to the vertical state characteristic of both radial and lineal configurations. Perhaps with the simple addition of data derived from wind meters and water-temperature gauges, an intended result of such a systemic scheme in large-scale deployments is an unprecedentedly extensive yet fine-grained mapping of actual sea states. In preferred embodiments of the system, trunk and branch lines of the take-off system will be laid out so they may be used to hardwire interconnected nodes. This will help provide a fail-safe system against such contingencies as major solar flares, sabotage, major thunderstorms, or acts of electronic warfare that might disrupt concurrent wireless transmission.

In its preferred embodiments, the combined system of the present invention calls for each and every independently functional unit of the apparatus to be fit to function as well as a node within a distributed information system. That is to say, nodes within the system are meant to be deployed in a matrix or array, with each node in able to process and send information to its several most closely located counterparts, and receive and react to inputs received from them in streams of data. Contact is maintained continuously among neighboring nodes; however, the volume and level of detail for data flowing through channels varies with context as information is distilled from raw data at the node level before and it is passed along (and each time thereafter). Generally, the in data stream includes time-stamped and position-watermarked fixes on state of trim and forces impinging on component right-angularly reorienting semi-submersible segments.

Within its matrix or array, each node is to be understood as functionally overloaded to perform several roles, often simultaneously: 1) as a component sensing device providing direct measurement of forces impinging on it, with readouts corrected to eliminate differences related to varying states of trim; 2) as a component, reactive, power-driven device continually maintaining or altering its state of trim; 3) as a communications device streaming data to a multi-tiered control system; 4) as a computer in a distributed network; and 5) as a device converting ocean wave energy to useful forms of power. The preferred strategic method and procedure is to seek optimization at the matrix level, not the component or device level. This axiom carries a number of important implications. The most obvious is that the automated response control mode at the apparatus level will generally be overridden by higher level control within the network.

Nodes in the matrix can be pre-assigned a programmed trimming bias according to their relative position in the matrix in order to emphasize selected functions; it is not necessary that the hardware apparatus be differentiated for such a division of labor to widely spaced nodes on the periphery of an array are to be preset so as to emphasize performance of the first and third functions numbered above, and deemphasize (generally without completely eliminating) the fifth one. Similarly, when prevailing winds and currents with great regularity come from the windward, more such peripheral nodes will be set windward and fewer leeward. An extreme event originating outside the matrix will therefore most likely first meet a single peripheral node already in a very cautious state of trim such as represented in FIG. 16 as 1610 & 1605, and consequently less likely to cause disabling damage to it. Alarms from the first node hit will reach nearby nodes in time for them to enter in terms of trim in a defensive posture like a boxer's crouch. When the stressful event impacts these nearby nodes, depending on their readings of its strength and direction, either the alarm will propagate a chain reaction of warning in certain directions or it will signal a "stand-down" from the high state of alert. In the former case, long before the great majority of tightly packed nodes toward the center of the array (for example, in the region around 1603 in FIG. 16 with their bias toward finding the sweet-spot for maximizing the fifth numbered function), they will have been safely detuned and trimmed down to weather the threatening event likely unscathed. When measurements along the chain of nodes indicate a continuing or increasing threat, the chain reaction produced might appear to an outside observer as the kind of cascading burst of neural activity associated with analogous brain activity. An observer of military background familiar with tactical matters would be right to interpret the layout of a carefully planned array as following principles relating to defense in strength of numbers, concentration of forces, out-post placement, recognizance, and defense in depth.

Three additional preferred variants of radially configured apparatus need to be properly introduced at this point, in part because they might well be assigned to fulfill roles as peripheral out-posted nodes of the kind just mentioned. As explained above in the paragraph in this section referencing FIG. 9, linearly configured instances of the invention will continue to convert power from the vertical state even in the most violent sea states. So the natural question is whether radially configured instances of the invention can in some form do so likewise, at least in some variant versions slightly differing from those thus far described. It is a significant issue, since the first four numbered functions above indeed require power at the node be available without interruption, lest apparatus be lost at sea unable to change trim or communicate further after a battery and/or reserve pneumatic pressure tank failure that might disable its reserve power sources. Fortunately, the answer is yes: radially configured versions like those pictured in FIGS. 17 & 18 will keep on converting wave energy to power in all states of trim including the vertical. It will be apparent to those skilled in the art that diverting some of this newly generated power in order to perform on-board functions can be readily accomplished. Additionally, the apparatus of FIGS. 17 & 18 will serve as mechanisms to permit continuous measurements of ambient condition even when the apparatus is in State V, vital information both for the node in question and all other nodes in the system networked with it, for determining when transitioning back to State H safely might recommence.

FIG. 17 presents in submarine view a familiar radially configured apparatus 1701 like that of FIG. 6, but with its central second section protruding like a piston from within a cylindrical base 1702, which in turn is solidly affixed atop a steep rocky up-cropping 1703 from the sea floor. Provided only that the piston-like elements slides within the cylinder of 1702, oscillation in the line running vertically will occur in response to wave energy to produce mechanical work irrespective of whether the semi-submersible segments are in horizontal state, as in FIG. 17, or the vertical state, as in FIG. 18. Viewed from above, the vertical line along which oscillation occurs would appear merely as a point, and the in fact a whole branch of prior art relates to such "point" systems for converting vertical heave to useful power. For the present invention, point production becomes significant primarily when it is in the vertical state, which is to say, precisely when the ambient sea state is too dangerously energetic to risk letting the submersible ends of the semi-submersible segments to be exposed to the surface. In FIG. 18, the radially configured apparatus 1802 oscillates vertically in reaction a massive submerged lower base 1801, called the Reactive Mass. The lower portion of interlinking segment 1803 works as a piston oscillating up and down relative to cylindrical part 1804 of the reactive mass. The inertia of the massive base keeps it from moving unison with the buoyant top part of the combined apparatus. The stacked, inverted funnel-shaped elements 1805, 1806 & 1807, called downward bias frictional collars, create a downward movement bias to the base by adding friction from the water to prevent the base moving upward readily in the water, thus reinforcing the effect of the inertia caused by the low riding reactive massive. Readings of forces encountered under such sever conditions are transmitted wirelessly via elements such as 1808, as well as via hard wired lines, including take-off trunk lines.

Off-shore floating wind energy platforms have attracted mounting interest and resources for rapid development, particularly in Germany, Scandinavia, the United Kingdom, and Japan. Varying schemes call for single spar-type buoys or multiple predominantly surface-riding buoys permitting a broader stance to support the tower for the wind turbine. Regardless of which approach is employed, the resultant buoyant structures can serve as the second element to which right-angularly reorienting buoyant semi-submersible segments of the present invention can be connected for tapping wave energy as well. Essentially all that is required is affixing shoulder joints to the buoys supporting the wind platform. The cogeneration of power from two green energy sources, wind and wave, has distinct advantages. At times brisk winds are present before much wave action is stirred up; at other times, strong swells occur hours or even days after winds have diminished or even entirely ceased. The higher fixed and maintenances costs of off-shore relative to land-based siting of wind power generation may be largely off-set by the additional power obtained from complementary conversion of wave energy through application of the present invention. Additionally, the addition of RRBSS segments around the base of the of a wind energy buoy will positively affect the stability and upright alignment of wind tower in heavy seas, for in state V they contribute to buoyancy while both shielding the base from battering waves and lowering the center of gravity of the combined structure.

Generally speaking, in preferred, advanced variants of the system in which networking employs artificial neural network methods, the routine power output response protocol will be implemented as a ramp function. That is to say, gradual, step-by-step adjustments in trim to safely maximize power production will be effected in a mildly sloping, linear process. In sharp contrast, the overload prevention response protocol, which applies pattern recognition strategies to the same set of information, generally will be implemented as a sigmoidal function. This means that as the sum of the threat factors increases, increasingly smaller further increments are required before the protocol overrides the routine power output response protocol, and adjusts trim for precautionary reasons rather than power optimization. In the steeply rising part of the sigmoidal curve, small increases threatening overload will thereupon result in larger amounts of precautionary detuning and de-trimming. Unforeseen events causing, or hitting with of sufficient force to potentially cause, damage to an apparatus, will trigger the emergency shut-down response protocol, implemented as a binary switch, or "trip-wire" function, according to whether or not a critical threshold has been crossed. Once it has been, nodes in immediate proximity will be detune and de-trim down to State V, and stand by to measure subsequent forces. Depending on the subsequent intensity of shocks measured by these latter nodes in relation to that binary threshold, one of two things will happen. In the case of sub-threshold subsequent readings, the result will be returning the node to the overload prevention response protocol. In the alternative case, subsequent higher-than-threshold readings may produce a chain-reaction cascading across the matrix in a particular direction or radiating outward in all directions ahead of the event requiring emergency response by other nodes in the network.

The invention claimed is:

1. A wave power conversion system comprising:
 a) an interlinking segment;
 b) a plurality of right angularly reorienting, buoyant semi-submersible segments, each of said semi-submersible segments horizontally and pivotally connected to said interlinking segment via a variably facing restrictive shoulder, each of said semi-submersible segments comprising a mean facing directional pitch and a primary axis, an armature and a buoyant float, said armature having one end connected to said interlinking segment and elsewhere along the primary axis connected to said variable float, said armature containing one or more telescoping elements nested within, said buoyant float linearly translatable along a primary axis of said armature;

c) wherein a first pivot connection between semi-submersible segments with the interlinking segment comprises means to vary the mean facing direction of the armature's primary axis over an angular range of approximately 90 degrees on an imaginary plane intersecting a central axis of the interlinking segment, a rack and pinion system to move and fix said mean facing direction throughout said range, and load redistribution performed by any of the following: shifting, addition, subtraction, redistribution and relocation of load of relatively weighty, massive elements in juxtaposition to the addition, subtraction, redistribution of elements with specific gravity less than 1.0, which thereby contribute to buoyancy;

d) a second pivot connection between said first pivot connection and said armature providing two degrees of freedom such that mechanical work is derived from the oscillation of said buoyant segments under the influence of passing swells driving pairs of fluid pumps constituting said restrictive shoulder, and further characterized by two degrees of freedom limited to two approximately perpendicular planes horizontal and vertical in reference with the water surface, irrespective of the said mean facing angle at which said first pivot connection is set at any given time;

e) a primary onboard electrical system powered by a portion of current generated from the pressurized fluid flow produced by said pairs of pumps, backed up by a secondary pneumatic system that permits shock absorption, pressurized air tank replenishment, and measurement of excessive forces.

2. The wave power conversion system of claim 1, further characterized by a drive mechanism for translation of said float and two-way telescoping of said armature comprising a two ended, push-pull chain reeled in and out from a canister magazine located toward the submersible end of said right angularly reorienting buoyant semi-submersible segments.

3. The wave power conversion system of claim 1, wherein clocked GPS positions are determined.

4. The wave power conversion system of claim 1, further comprising means for detecting and measuring force, amplitude, frequency, and direction of swells in the sea state.

5. The wave power conversion system of claim 4 further comprising means to transmit data to and receive data from other adjacent or remote units of said apparatus deployed in a matrix or array.

6. The wave power conversion system of claim 1, wherein weighted factoring of data received from adjacent or remotely distant units is incorporated to trim and adjust elements of the local apparatus.

7. The wave power conversion system of claim 1 further comprising interfacing elements at an outboard end of individual ones of said armatures, enabling rotary coupling of armatures connected to other interlinking segments, such that the system comprises a plurality of interlinking segments connected by armatures.

8. The wave power conversion system of claim 1, further provided said interlinking segment is fixed to the sea floor or an outcropping rising therefrom.

9. The wave power conversion system of claim 1, further provided said interlinking segment is attached to a vessel or other platform supported by buoyancy.

* * * * *